(12) United States Patent
Vitito

(10) Patent No.: US 7,500,705 B2
(45) Date of Patent: Mar. 10, 2009

(54) VEHICLE ENTERTAINMENT SYSTEM WITH SAFETY LOCK FOR HINGE STRUCTURE

(76) Inventor: Christopher J. Vitito, 514 Longmeadow St., Celebration, FL (US) 34747

( * ) Notice: Subject to any disclaimer, the term of this patent is extended or adjusted under 35 U.S.C. 154(b) by 469 days.

(21) Appl. No.: 11/453,236

(22) Filed: Jun. 15, 2006

(65) Prior Publication Data

US 2006/0288380 A1 Dec. 21, 2006

Related U.S. Application Data

(63) Continuation-in-part of application No. 11/177,405, filed on Jul. 11, 2005.

(60) Provisional application No. 60/778,362, filed on Mar. 3, 2006, provisional application No. 60/750,820, filed on Dec. 16, 2005, provisional application No. 60/732,656, filed on Nov. 3, 2005, provisional application No. 60/690,874, filed on Jun. 16, 2005.

(51) Int. Cl.
*B60N 99/08* (2006.01)

(52) U.S. Cl. ................. 296/37.8; 248/917; 348/837

(58) Field of Classification Search ............. 296/37.8; 224/311; 248/917, 918, 919, 920, 921, 922, 248/923, 924; 348/837; 361/681
See application file for complete search history.

(56) References Cited

U.S. PATENT DOCUMENTS

| | | | |
|---|---|---|---|
| 4,690,362 A | 9/1987 | Helgeland | |
| 5,027,200 A | 6/1991 | Petrossian et al. | |
| 5,161,766 A | 11/1992 | Arima | |
| 5,436,792 A | 7/1995 | Leman et al. | |
| 5,544,010 A | 8/1996 | Schultz et al. | |
| 5,751,548 A | 5/1998 | Hall et al. | |
| 5,775,762 A | 7/1998 | Vitito | |
| 5,927,784 A | 7/1999 | Vitito | |
| 5,946,055 A | 8/1999 | Rosen | |
| 5,969,939 A | 10/1999 | Moss et al. | |
| 6,007,038 A | 12/1999 | Han | |
| 6,023,411 A | 2/2000 | Howell et al. | |
| 6,049,450 A | 4/2000 | Cho et al. | |
| 6,115,086 A | 9/2000 | Rosen | |
| 6,116,560 A | 9/2000 | Kim | |
| 6,129,321 A | 10/2000 | Minelli et al. | |
| 6,130,727 A | 10/2000 | Toyozumi | |
| 6,157,418 A | 12/2000 | Rosen | |
| 6,181,387 B1 | 1/2001 | Rosen | |
| 6,186,459 B1 | 2/2001 | Ma | |
| 6,199,810 B1 | 3/2001 | Wu et al. | |

(Continued)

FOREIGN PATENT DOCUMENTS

DE 4118711 10/1992

(Continued)

*Primary Examiner*—Lori L Lyjak
(74) *Attorney, Agent, or Firm*—Welsh & Flaxman LLC

(57) ABSTRACT

A vehicle includes a ceiling, a cradle secured within the ceiling of the vehicle and a video system selectively secured to the cradle for movement between a use position and a storage position. The video system includes a base shaped and dimensioned for selectively coupling with the cradle. The base includes a first hinge facilitating rotation of the video system, wherein the first hinge includes a safety lock preventing movement of the video system from the second storage position to the first use position.

20 Claims, 27 Drawing Sheets

U.S. PATENT DOCUMENTS

| | | |
|---|---|---|
| 6,208,508 B1 | 3/2001 | Ruch et al. |
| 6,246,449 B1 | 6/2001 | Rosen |
| 6,259,601 B1 | 7/2001 | Jaggers et al. |
| 6,279,977 B1 | 8/2001 | Chen |
| 6,292,236 B1 | 9/2001 | Rosen |
| 6,339,455 B1 | 1/2002 | Allan et al. |
| 6,361,012 B1 | 3/2002 | Chang |
| 6,364,390 B1 | 4/2002 | Finneman |
| 6,409,242 B1 | 6/2002 | Chang |
| 6,412,848 B1 | 7/2002 | Ceccanese et al. |
| 6,443,574 B1 | 9/2002 | Howell et al. |
| 6,464,185 B1 | 10/2002 | Minelli et al. |
| 6,494,527 B1 | 12/2002 | Bischoff |
| 6,522,368 B1 | 2/2003 | Tuccinardi et al. |
| 6,530,547 B1 | 3/2003 | Wada |
| 6,556,435 B1 | 4/2003 | Helot et al. |
| 6,606,543 B1 | 8/2003 | Sproule et al. |
| 6,633,347 B2 | 10/2003 | Kitazawa |
| 6,644,616 B1 | 11/2003 | Tsukuda |
| 6,663,064 B1 | 12/2003 | Minelli et al. |
| 6,669,260 B2 | 12/2003 | Clark et al. |
| 6,678,892 B1 | 1/2004 | Lavelle et al. |
| 6,683,786 B2 | 1/2004 | Yin et al. |
| 6,695,376 B1 | 2/2004 | Hirano |
| 6,702,238 B1 | 3/2004 | Wang |
| 6,711,003 B2 | 3/2004 | Nakasuna |
| 6,717,798 B2 | 4/2004 | Bell et al. |
| 6,769,989 B2 | 8/2004 | Smith et al. |
| 7,084,932 B1 | 8/2006 | Mathias et al. |
| 2001/0005083 A1 | 6/2001 | Serizawa et al. |
| 2002/0005917 A1 | 1/2002 | Rosen |
| 2002/0085129 A1 | 7/2002 | Kitazawa |
| 2002/0105507 A1 | 8/2002 | Tranchina et al. |
| 2002/0113451 A1 | 8/2002 | Chang |
| 2002/0135974 A1 | 9/2002 | Bell et al. |
| 2002/0149708 A1 | 10/2002 | Nagata et al. |
| 2002/0163219 A1 | 11/2002 | Clark et al. |
| 2002/0184632 A1 | 12/2002 | Reitmeier |
| 2003/0128505 A1 | 7/2003 | Yin et al. |
| 2003/0137584 A1 | 7/2003 | Norvell et al. |
| 2003/0192950 A1 | 10/2003 | Muterspaugh |
| 2004/0017652 A1 | 1/2004 | Billington et al. |
| 2004/0061995 A1 | 4/2004 | McMahon |
| 2004/0083491 A1 | 4/2004 | Chang |
| 2004/0085485 A1 | 5/2004 | Schedivy |
| 2004/0104905 A1 | 6/2004 | Chung et al. |
| 2004/0175155 A1 | 9/2004 | Liu |
| 2004/0189881 A1 | 9/2004 | Cook et al. |
| 2004/0212746 A1* | 10/2004 | Rosen ..................... 348/837 |
| 2004/0212957 A1 | 10/2004 | Schedivy |
| 2004/0227696 A1 | 11/2004 | Schedivy |
| 2004/0227861 A1 | 11/2004 | Schedivy |
| 2004/0228622 A1 | 11/2004 | Schedivy |
| 2005/0025466 A1 | 2/2005 | Yen et al. |
| 2005/0046756 A1 | 3/2005 | Chang |
| 2005/0066369 A1 | 3/2005 | Chang |
| 2005/0099547 A1 | 5/2005 | Vitito |
| 2006/0050018 A1 | 3/2006 | Hutzel et al. |
| 2006/0107295 A1 | 5/2006 | Margis et al. |
| 2006/0128303 A1 | 6/2006 | Schedivy |

FOREIGN PATENT DOCUMENTS

| | | |
|---|---|---|
| JP | 62-231847 | 10/1987 |
| JP | 63-219440 | 9/1988 |
| JP | 01-300775 | 12/1989 |
| JP | 02-149083 | 6/1990 |
| JP | 05-050883 | 3/1993 |

* cited by examiner

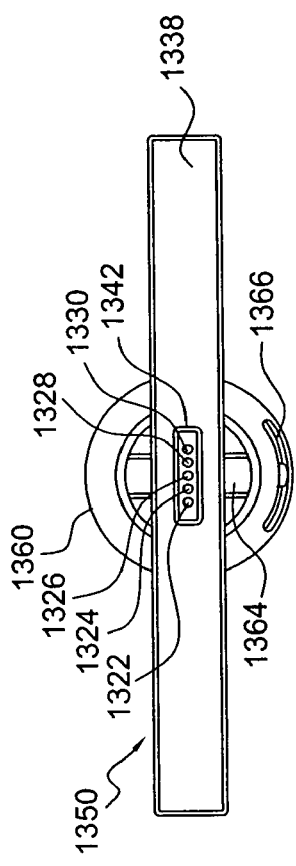
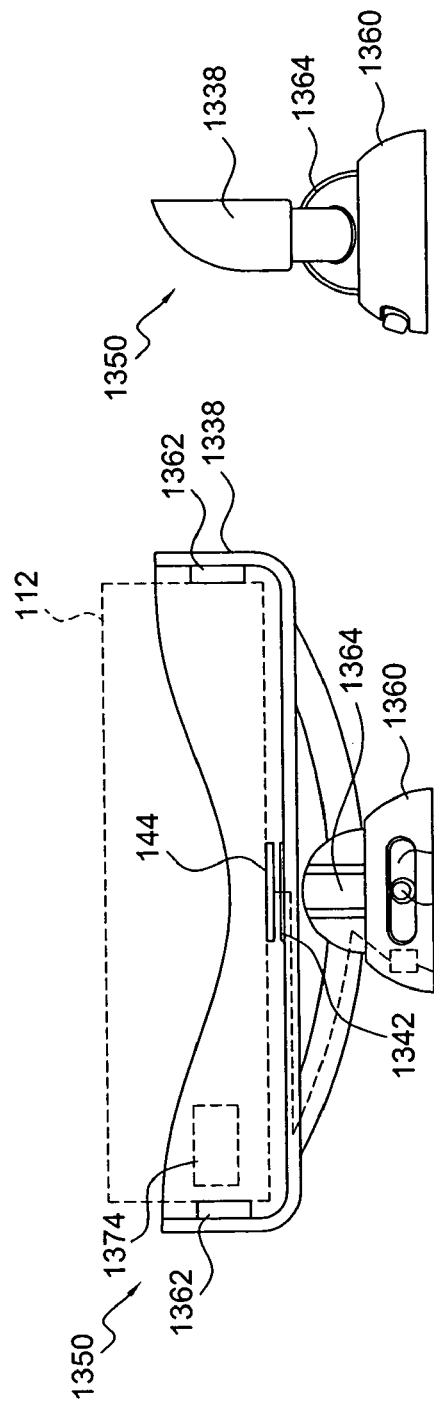

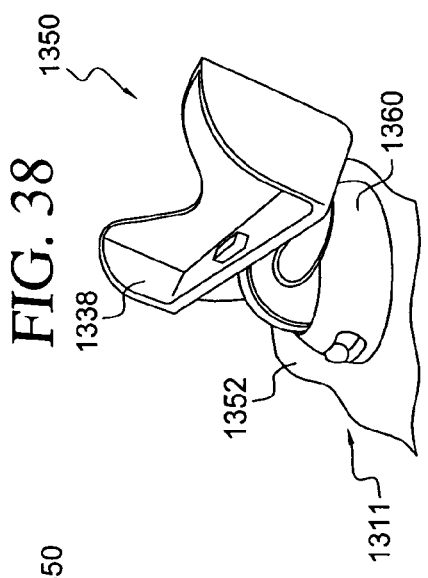
FIG. 36
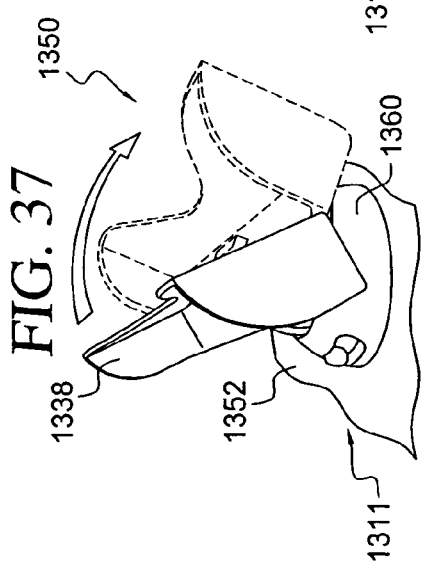
FIG. 37
FIG. 38
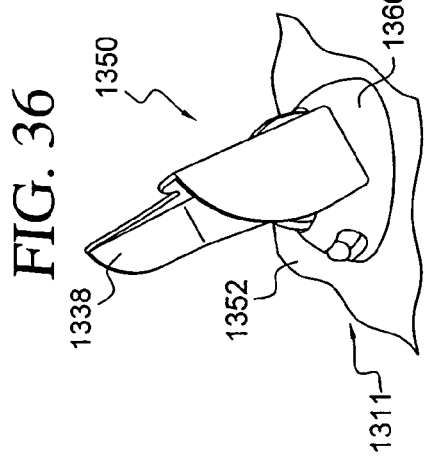
FIG. 39
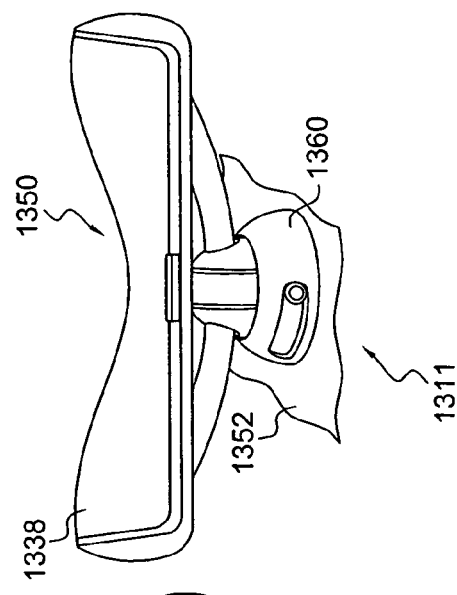
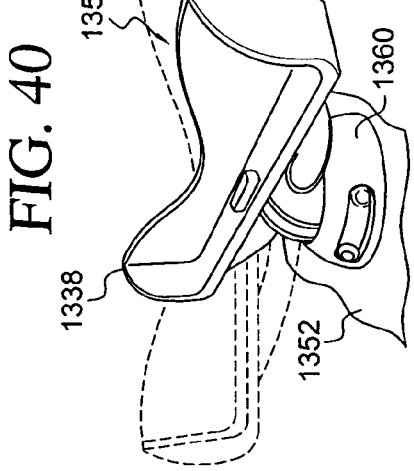
FIG. 40
FIG. 41
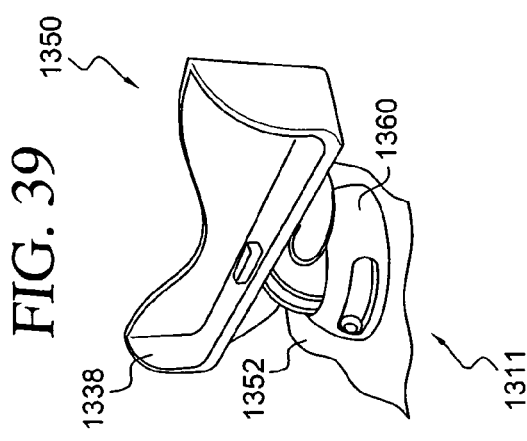

VEHICLE ENTERTAINMENT SYSTEM WITH SAFETY LOCK FOR HINGE STRUCTURE

CROSS REFERENCE TO RELATED APPLICATION

This application is a continuation-in-part of U.S. patent application Ser. No. 11/177,405, filed Jul. 11, 2005, entitled "Vehicle Entertainment System" which is currently pending and which claims the benefit of U.S. Provision Application Ser. No. 60/690,874, filed Jun. 16, 2005, entitled "Vehicle Entertainment System"; and this application claims the benefit of U.S. Provisional Patent Application Ser. No. 60/732,656, filed Nov. 3, 2005, entitled "Vehicle Entertainment System", U.S. Provisional Patent Application Ser. No. 60/778,362, filed Mar. 3, 2006, entitled "Vehicle Entertainment System", and U.S. Provisional Patent Application Ser. No. 60/750,820, filed Dec. 16, 2005, entitled "Vehicle Entertainment System Including Monitor for Rear View Enhancement".

BACKGROUND OF THE INVENTION

1. Field of the Invention

The invention relates to mobile entertainment systems. More particularly, the invention relates to portable entertainment systems adapted for use in vehicles.

2. Description of the Prior Art

Entertainment systems for automobiles are well known. As such, many advances have been made in the development of entertainment systems that make the otherwise tedious task of riding in an automobile more bearable. In addition to the development of overhead systems pioneered by the present inventor, systems that mount at various locations within an automobile have also been developed.

These entertainment systems allow multiple individuals to view a variety of different video sources within the same vehicle. However, and as those skilled in the art will certainly appreciate, it is desirable to provide added versatility to these entertainment systems. The present invention attempts to accomplish this by providing a system whereby the video system may be selectively removed from a mounting structure within an automobile and used at other locations.

SUMMARY OF THE INVENTION

It is, therefore, an object of the present invention to provide a vehicle including a ceiling, a cradle secured within the ceiling of the vehicle and a video system selectively secured to the cradle for movement between a use position and a storage position. The video system includes a base shaped and dimensioned for selectively coupling with the cradle. The base includes a first hinge facilitating rotation of the video system, wherein the first hinge includes a safety lock preventing movement of the video system from the storage position to the use position.

It is also an object of the present invention to provide a vehicle wherein the base further includes a second hinge permitting rotation of the video system about an axis substantially perpendicular to the axis of the first hinge.

It is also another object of the present invention to provide a vehicle wherein edges of the video system are exposed with no surrounding structure when in its storage position.

It is also a further object of the present invention to provide a vehicle wherein the video system includes a video source and a video monitor.

It is another object of the present invention to provide a vehicle wherein the video system includes a housing in which a video monitor and video source are housed, the housing depending from the base shaped and dimensioned for selectively attachment to the cradle.

It is still another object of the present invention to provide a vehicle wherein the base includes a mechanism for pivoting the video monitor.

It is a further object of the present invention to provide a vehicle including a cover for covering the cradle when it is not in use, the cover being substantially flush with the headliner and conforming with a profile thereof.

It is yet a further object of the present invention to provide a vehicle wherein the cover includes a light.

It is also an object of the present invention to provide a vehicle wherein the cover includes a power source.

It is another object of the present invention to provide a vehicle wherein the cradle is substantially flush with a headliner of the vehicle.

It is a further object of the present invention to provide an entertainment system for a vehicle. The system includes a cradle shaped and dimensioned for securing within a ceiling of the vehicle, and a video system selectively secured to the cradle for movement between a use position and a storage position. The video system includes a base shaped and dimensioned for selectively coupling with the cradle. The base includes a first hinge facilitating rotation of the video system, wherein the first hinge includes a safety lock preventing movement of the video system from the storage position to the use position.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWINGS

FIG. 33 is a top view of a dash mounted docking station in accordance with the present invention.

FIG. 34 is a front view of the docking station shown in FIG. 33.

FIG. 35 is a side view of the docking station shown in FIG. 33.

FIGS. 36, 37 and 38 show the forward and rearward pivoting ability of the docking station shown in FIG. 33.

FIGS. 39, 40 and 41 show the lateral pivoting capabilities of the docking station shown with reference to FIG. 33.

DESCRIPTION OF THE PREFERRED EMBODIMENTS

Figure 1:
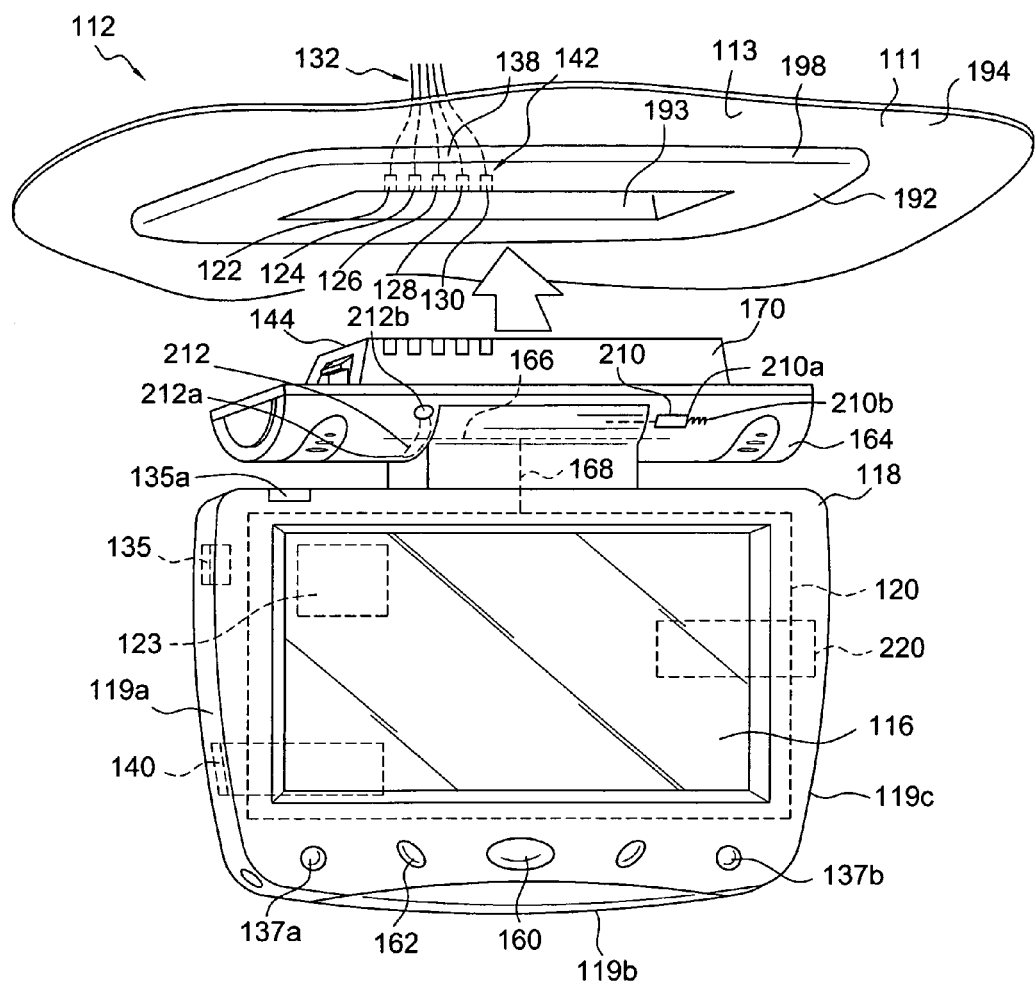
FIG. 1 is a perspective view of an embodiment of the video system and cradle.
Figure 2:
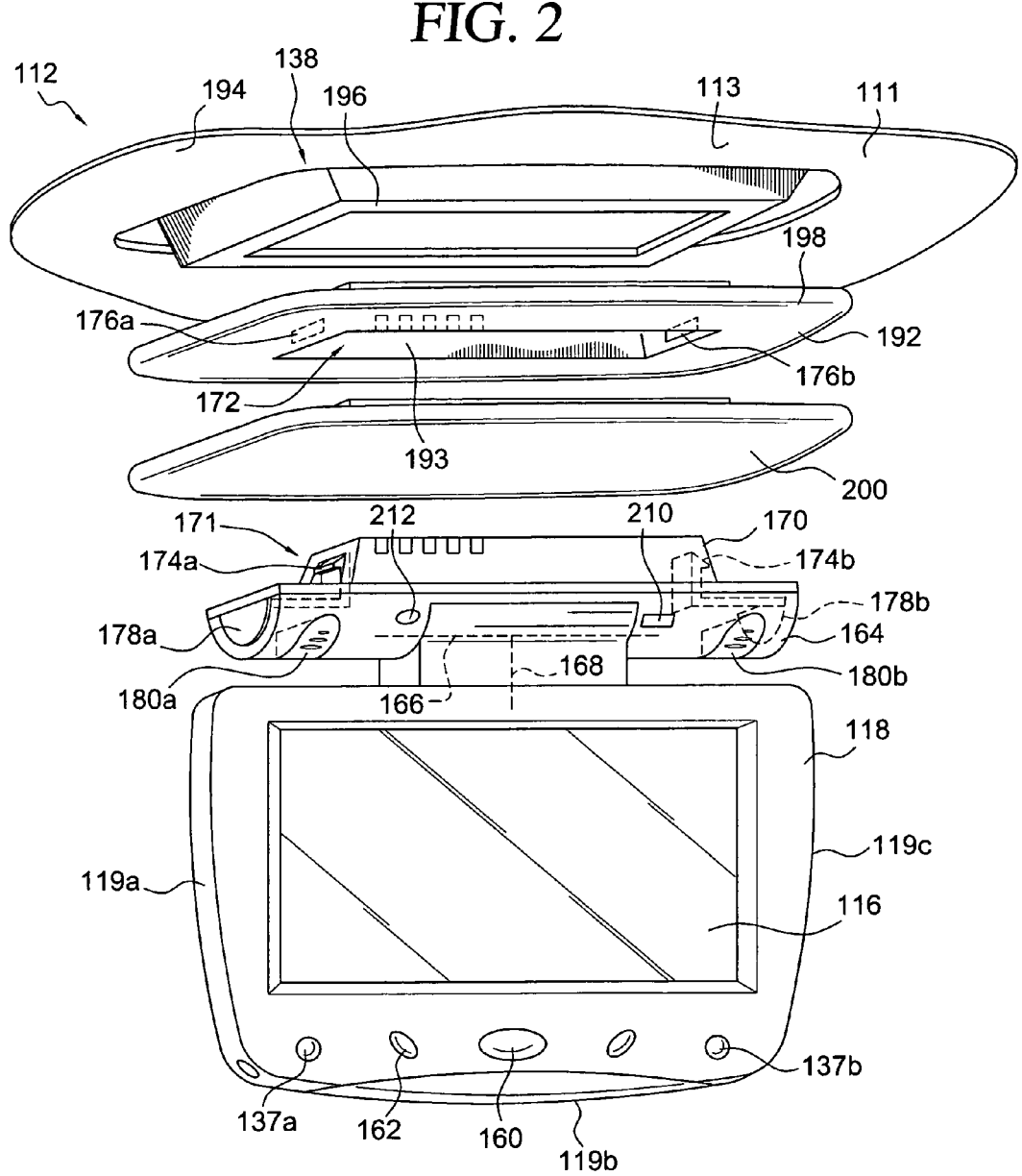
FIG. 2 is an exploded view of the video system and cradle shown in FIG. 1 (with the cover for use when the video system is not in use shown).
Figure 3:
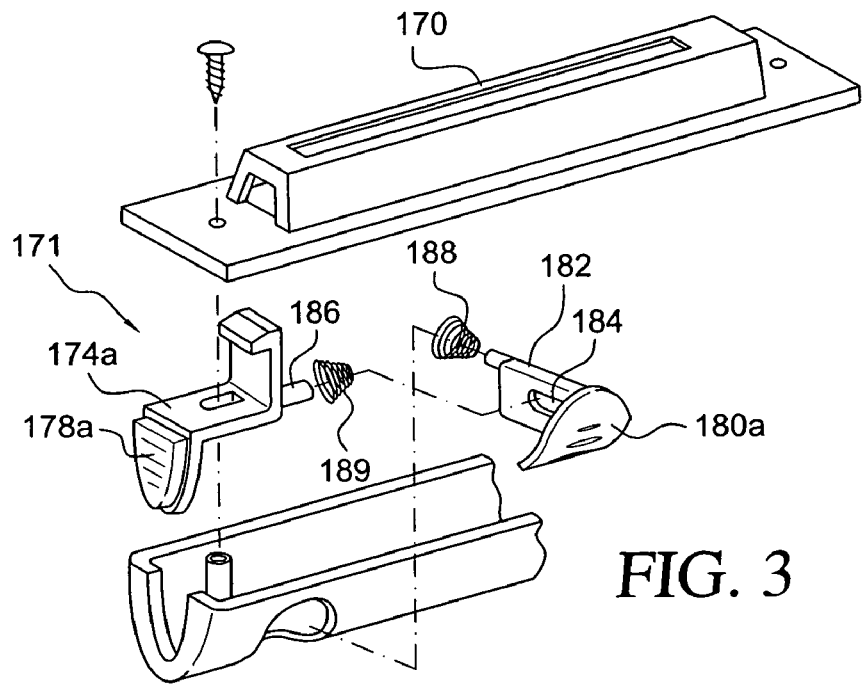
FIG. 3 is an exploded view of the projecting attachment member.
Figure 4:
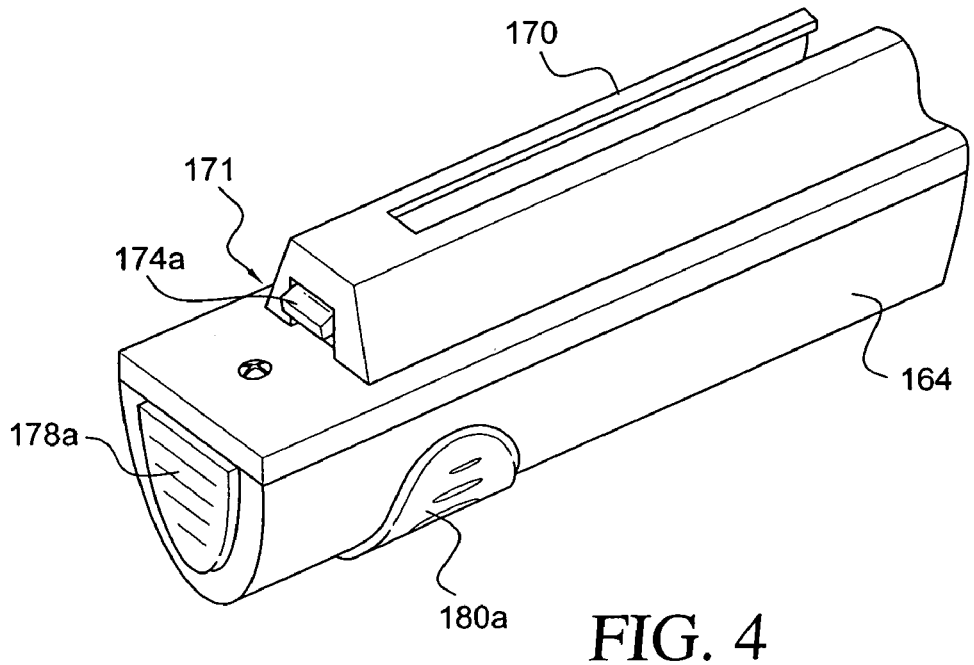
FIG. 4 is a perspective view of the projecting attachment member.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to FIGS. 1, 2, 3 and 4, and in accordance with a first embodiment of the present invention, an automobile entertainment system 110 is disclosed. The automobile entertainment system 110 is composed of a series of video and audio components integrated within an automobile 111. As those skilled in the art will certainly appreciate, the various embodiments of the present entertainment system are disclosed herein with reference to their use within an automobile. However, the entertainment system could certainly be used in other vehicles, for example, boats or planes, without departing from the spirit of the present invention.

Referring to FIGS. 1, 2, 3 and 4, a video system 112 and mounting structure are disclosed. The video system 112 is adapted for selective mounting within the ceiling 113 of an automobile 111. It is further contemplated those skilled in the art will appreciate the concepts underlying the present invention provide for the possibility of selectively mounting the video system within a variety of locations within an automobile, for example, the dashboard of an automobile.

The video system 112 is detachably mounted within a cradle 138 secured to the ceiling 113 of an automobile 111. The video system 112 generally includes a video monitor 116 for presenting media content and a video source 120 integrated therewith.

In accordance with a preferred embodiment of the present invention, the video source is a DVD player coupled to the video monitor 116 for the transmission of video content thereto. The DVD player, or other video source 120, is integrated within the same video housing 118 as the video monitor 116. In addition to, or in place of, video source 120 it is also contemplated a hard drive video source 123 may be integrated with the video monitor 116. The hard drive 123 includes inputs for receiving video content and outputs for transmitting video content to the video monitor 116, both of which are well known to those skilled in the art. However, and as those skilled in the art will certainly appreciate, the video source may take a variety of other forms (for example, universal media disk) without departing from the spirit of the present invention.

The video monitor 116, DVD player 120, hard drive 123 and associated control components are mounted within the housing 118. In accordance with a preferred embodiment, the video monitor 116 is a TFT LCD screen. However, it is contemplated other monitor constructions, for example, plasma, Ultra High Definition VGA, touch screen VGA, organic LED, fabric based monitors (e.g., flexible TFT) etc., may be used without departing from the spirit of the present invention.

With regard to the DVD player 120, it is integrally molded within the housing 118 and positioned for insertion of the DVDs behind the video monitor 116. By mounting the DVD player 120 in this way, a stable structure is developed that is well adapted for the automobile environment. While the DVD player is disclosed as being a slot-loaded design with insertion behind the video monitor, the DVD player could take a variety of other forms without departing from the spirit of the present invention. Those skilled in the art will appreciate the various DVD designs that may be employed, for example, many can be seen in U.S. patent application Ser. No. 11/177,405, which is incorporated herein by reference.

Figure 5:
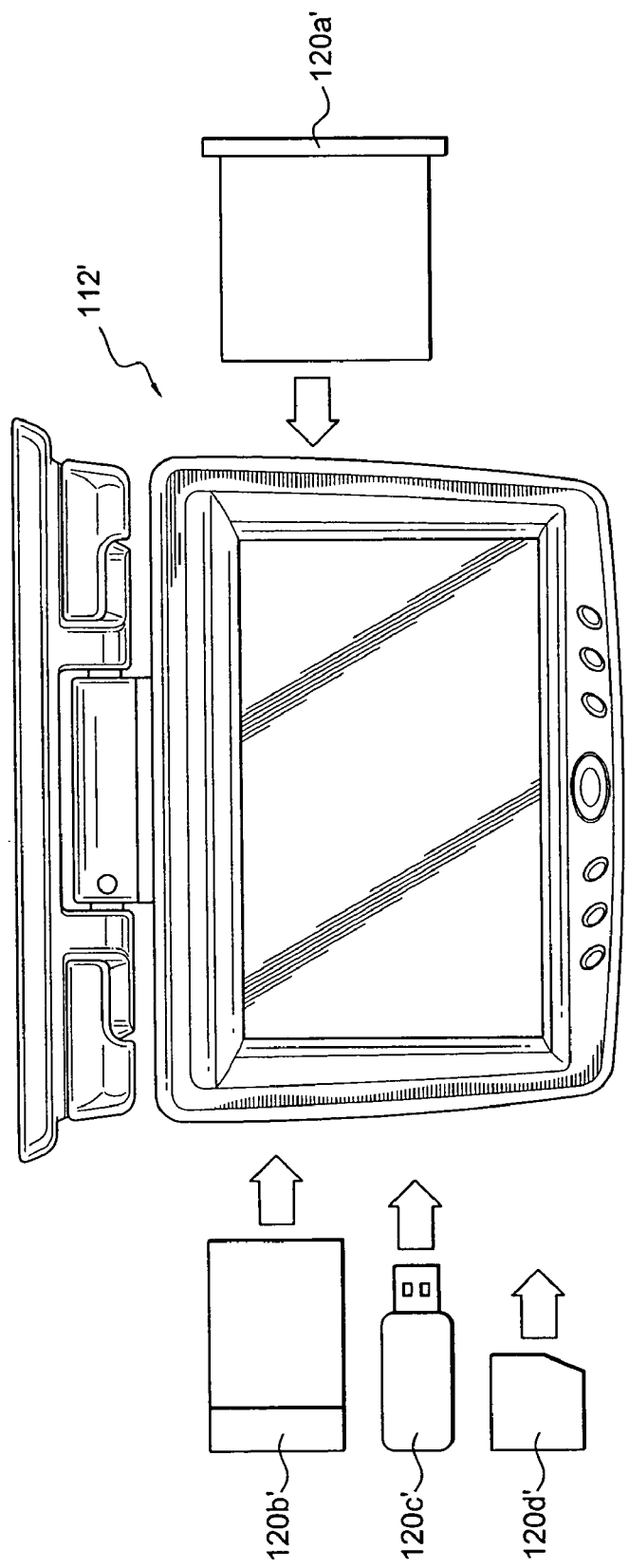
FIG. 5 is a front plan view of a video system in accordance with an alternate embodiment.

Referring to FIG. 5, an alternate modular video system 112' is disclosed. In accordance with this system, the various components are not hardwired but are incorporated within the video system 112' via interchangeable modules. For example, the video system 112' is provided with a removable and interchangeable module 120a' in which a hard disk drive, flash memory drive, DVD player/recorder, CD player/recorder, Blue Ray player/recorder, and an auxiliary battery may be incorporated. As those skilled in the art will certainly appreciate, other slot type modules are utilized within the electronics industry and these may also be incorporated into the video system 112'. For example, a slot for a PCMCIA Card and/or Ie:Cell.Air card 120b' for downloading materials may be incorporated. Similarly, memory cards 120c' and USB cards 120d' may be incorporated into the video system 112'.

The video system 112 is detachably mounted within a cradle 138 formed in or secured to the ceiling 113 of the automobile 111. The design of the video system 112 and cradle 138 allows for the creation of multiple cradles 138 within an automobile, permitting selective positioning of the video system 112 at the various cradle locations within the automobile 111.

More particularly, the base 164 of the video system 112 is mounted to a cradle 138 formed within the ceiling 113 of the automobile 111 in a manner that permits rotation of the video housing 118 about multiple axes. The base 164 includes a first hinge 166 that facilitates rotation of the video housing 118 about an axis substantially parallel to the ceiling 113 of the automobile 111 for movement from its upward storage position (see, for example, FIG. 12) to a downward use position (see, for example, FIG. 13) for viewing thereof. In an effort to prevent unintentional rotation of the video system 112, in particular, the video housing 118 and associated video monitor 116, the first hinge 166 is provided with a safety lock 210. In accordance with a preferred embodiment of the present invention, the safety lock 210 is a latch member shaped and dimensioned to selectively interfere with rotation of the video system 112 about the first hinge 166. With this in mind, the safety lock 210 includes a user engagable handle 210a allowing a user to move the safety lock 210 from its interference position blocking rotation of the video system 112 about the first hinge 166 to a release position. Once the handle 210a is released, a biasing member 210b (for example, a spring) forces the safety lock 210 back to its interference position. The safety lock 210 will maintain the video system 112 in its storage position until such a time that a user desires to rotate the video system 112 about the first hinge 166 into its use position. In order to accomplish this rotation, the user must release the safety lock 210 by actuating the safety lock 210 and rotating the video system 112 from its storage position to its use position.

The base 164 further includes a second hinge 168 that permits rotation of the video housing 118 about an axis substantially perpendicular to the axis of the first hinge 166. As such, the second hinge 168 allows for rotation of the video housing 118 in a manner that facilitates viewing of the video monitor 116 from opposite sides of the automobile 111. The video system 112 is, therefore, designed for rotation about multiple axes and may be freely rotated to improve viewing regardless of where the video system 112 is being used.

In addition to the provision of a safety lock 210 associated with the first hinge 166, the hinge structure also includes a tensioning mechanism 212. The tensioning mechanism 212 is designed to permit free rotation of the video system 112 when desired, but apply preselected tension to the first and second hinges 166, 168 for controlling vibration of the video system 112 as the automobile 111 moves and vibrations are transmitted throughout the automobile 111. In addition to preventing the transmission of vibrations to the video system 112, the tensioning mechanism 212 also allows for controlled positioning of the video system 112 at a variety of angular orientations by simply releasing and reapplying the tensioning mechanism 212. In accordance with a preferred embodiment of the present invention, the tensioning mechanism 212 includes a friction plate 212a which selectively engages the first hinge 166 to hold the video system 112 in a desired orientation. The friction plate 212a is attached to a handle 212b which allows the user to move the friction plate 212a between a tensioned orientation and an untensioned orientation. Similar frictional plates (not shown) are associated with the second hinge 168 for maintaining desired positioning.

The base 164 further includes a projecting attachment member 170 permitting selective coupling of the video system 112 within the automobile 111. The attachment member 170 includes a fastening mechanism 171 that permits secure and convenient attachment/removal of the video system 112 from the cradle 138. More particularly, the fastening mechanism 171 includes first and second latch members 174a, 174b shaped and dimensioned for engaging respective first and second latching recesses 176a, 176b formed on opposite sides of the cradle 138. The first and second latch members 174a, 174b are respectively actuated by primary release buttons 178a, 178b of the first and second latch members 174a, 174b positioned at opposite ends of the video system base 164. By pushing the release buttons 178a, 178b, the first and second latch members 174a, 174b disengage from the first and second recesses 176a, 176b, permitting the removal of the video system 112 from the cradle 138.

Controlled release of the video system 112 from the cradle 138 is achieved through the provision of first and second safety buttons 180a, 180b which selectively lock the first and second latch members 174a, 174b in their latched position. More particularly, each of the first and second safety buttons 180a, 180b include an obstructing member 182, which sits within the path of the first and second latch members 174a, 174b preventing movement thereof. Each of the obstructing members 182, however, includes a release aperture 184 which aligns with a projection 186 of the respective latch members 174a, 174b when the safety buttons 184a, 184b, are pressed to permit movement of the latch member 174a, 174b and release of the video system 112. Each of the first and second safety buttons 180a, 180b is spring biased via a spring 188 to ensure they remain in their safety position unless intentionally pushed to permit movement of the first and second latch members 174a, 174b.

Figure 6:
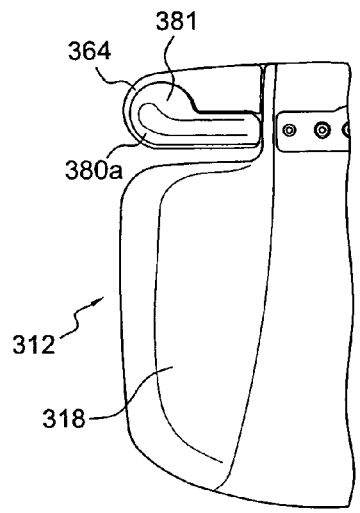
FIGS. 6, 7 and 8 are respectively a plan view, perspective view and perspective view of a video system in accordance with an alternate embodiment of the system shown in FIG. 1.
Figure 7:
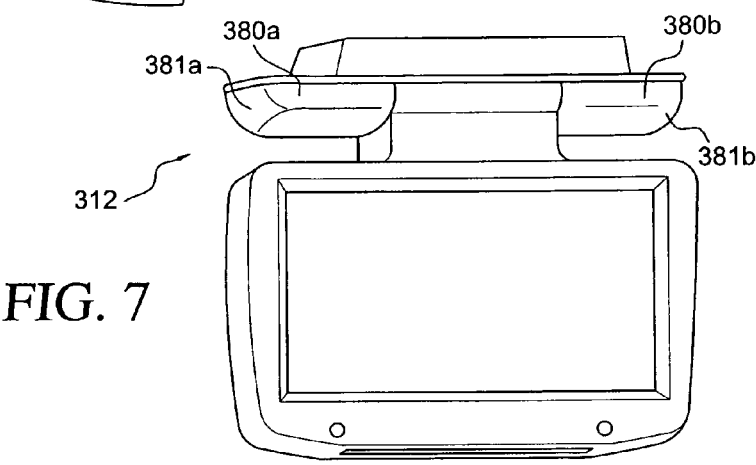
Figure 8:
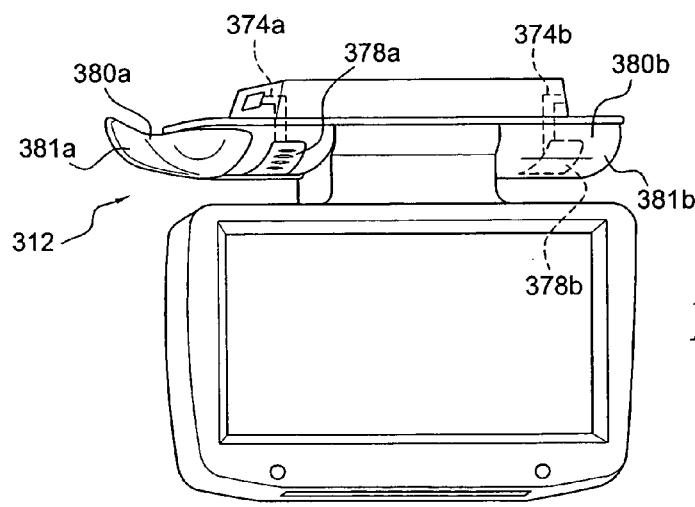

Referring to FIGS. 6, 7 and 8, the appearance of the video system 312' may be further enhanced by integrating the safety buttons 380a, 380b with cover plates 381a, 381b positioned at the opposite ends of the base 364. In accordance with this embodiment, rotation of the cover plates 381a, 381b actuates the safety button 380a, 380b to permit actuation of the first and second latch members 374a, 374b and reveal the first and second release buttons 378a, 378b.

The security of this system may be even further enhanced by linking the first and second latch members 374a, 374b, requiring that the first and second latch members 374a, 374b be actuated simultaneously to permit removal of the video system 312 from the cradle 138. As those skilled in the art will appreciate, a variety of latching structures may be employed without departing from the spirit of the present invention.

The cradle 138 is shaped and dimensioned for receiving and securing the video system 112 to the ceiling 113 of the automobile 111. As those skilled in the art will certainly appreciate, similar cradles may be provided at other locations permitting use of the video system 112 at other remote locations within the same automobile or in other automobiles.

The cradle 138 utilized in accordance with a preferred embodiment of the present invention includes quick release electrical connections 142 for the audio input 122, audio output 124, video input 126, video output 128 and power supply 130 (although one embodiment contemplates a system which connects only to a power supply). The video system 112, and particularly, the base 164 of the video system 112, includes mating electrical connections 144 for transmitting electricity and a/v signals between the cradle 138 and the video system 112. In particular, when the video system 112 is mounted upon the cradle 138, the respective electrical connections 142, 144 mate to provide for the transmission of power and a/v signals between the video system 112 and the cradle 138. As those skilled in the art will certainly appreciate, other readily removable electrical connections for other purposes may also be supplied.

In addition to the electrical connections provided on the cradle 138, and as was discussed above, the cradle 138 also includes a fastening mechanism 172 adapted for selective engagement with the fastening mechanism 171 of video system 112. The fastening mechanism 172 of the cradle 138 is composed of a primary recess 193 into which the projecting attachment member 170 of the base 164 of the video system 112 may be positioned. The fastening mechanism 172 of the cradle 138 also includes the first and second latching recesses 176a, 176b that are shaped and dimensioned for selectively and securely coupling with the first and second latch members 174a, 174b of the video system base 164. As those skilled in the art will certainly appreciate, the primary recess of the cradle and the projecting attachment member of the base may be formed in a variety of shapes so long as they are designed to provide for a secure attachment with very little play between the attached components.

The usefulness of the present embodiment is enhanced by the fact the cradle 138 is substantially recessed within the ceiling 113 of the automobile 111. More particularly, each cradle 138 installed with an automobile 111 is positioned such that the face plate 192 is substantially flush with the headliner 194, or other automobile surface, directly adjacent thereto. With this in mind, the cradle 138 is constructed with a metal mounting plate 196 directly secured to the ceiling 113 of the automobile 111 and a ceiling docking port 198 secured thereto. In accordance with a preferred embodiment, the face place 192 is formed as part of the ceiling docking port 198. The ceiling docking port 198 includes the electrical and mechanical components discussed above which allow for the direct attachment of the video system 112 thereto.

Figure 9:
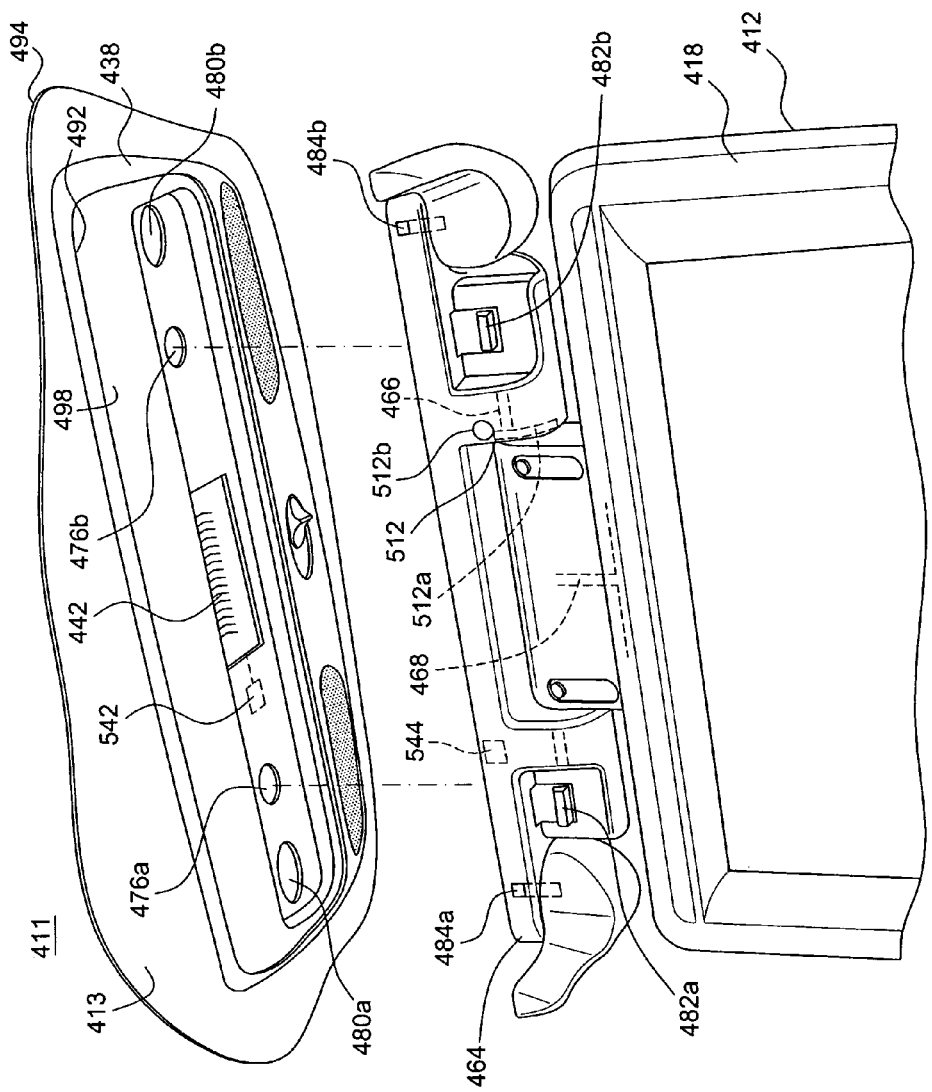
FIGS. 9, 10 and 11 are various views showing an attachment mechanism in accordance with an alternate embodiment of the present invention.
Figure 10:
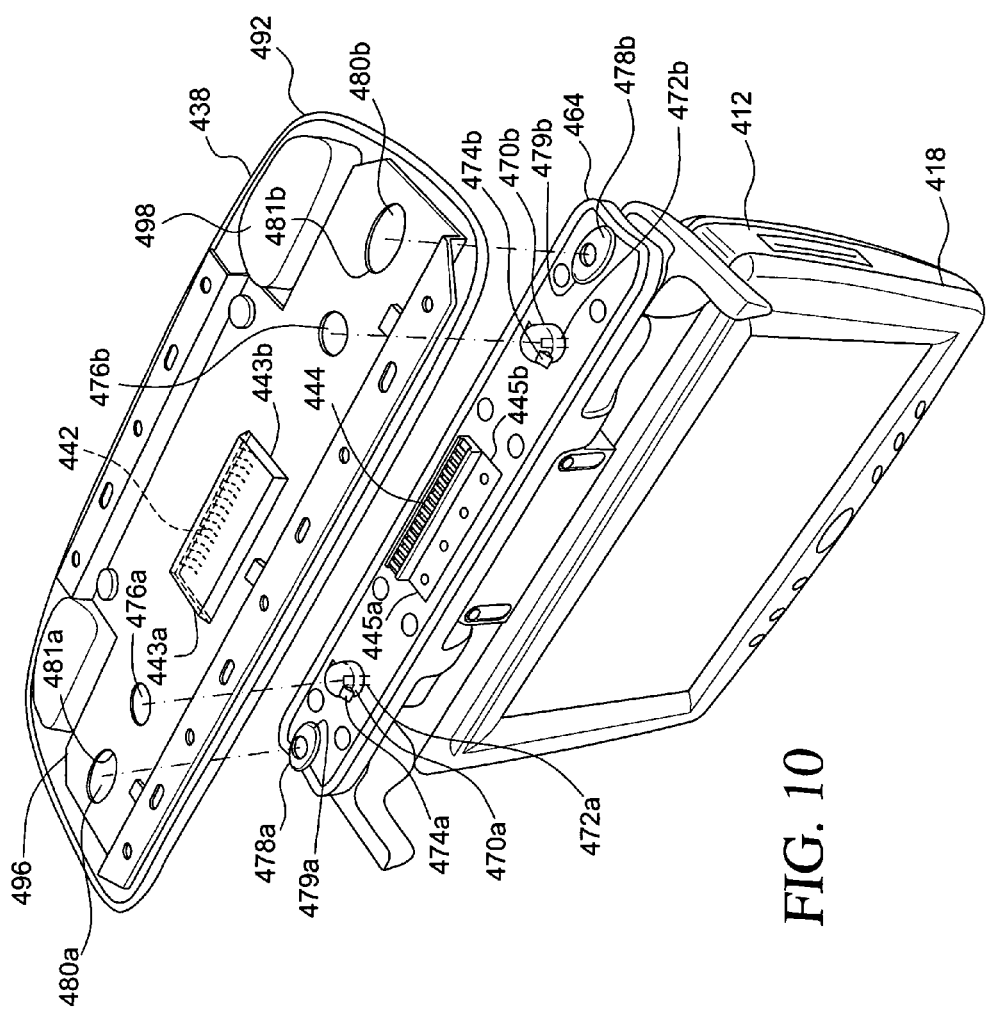
Figure 11:
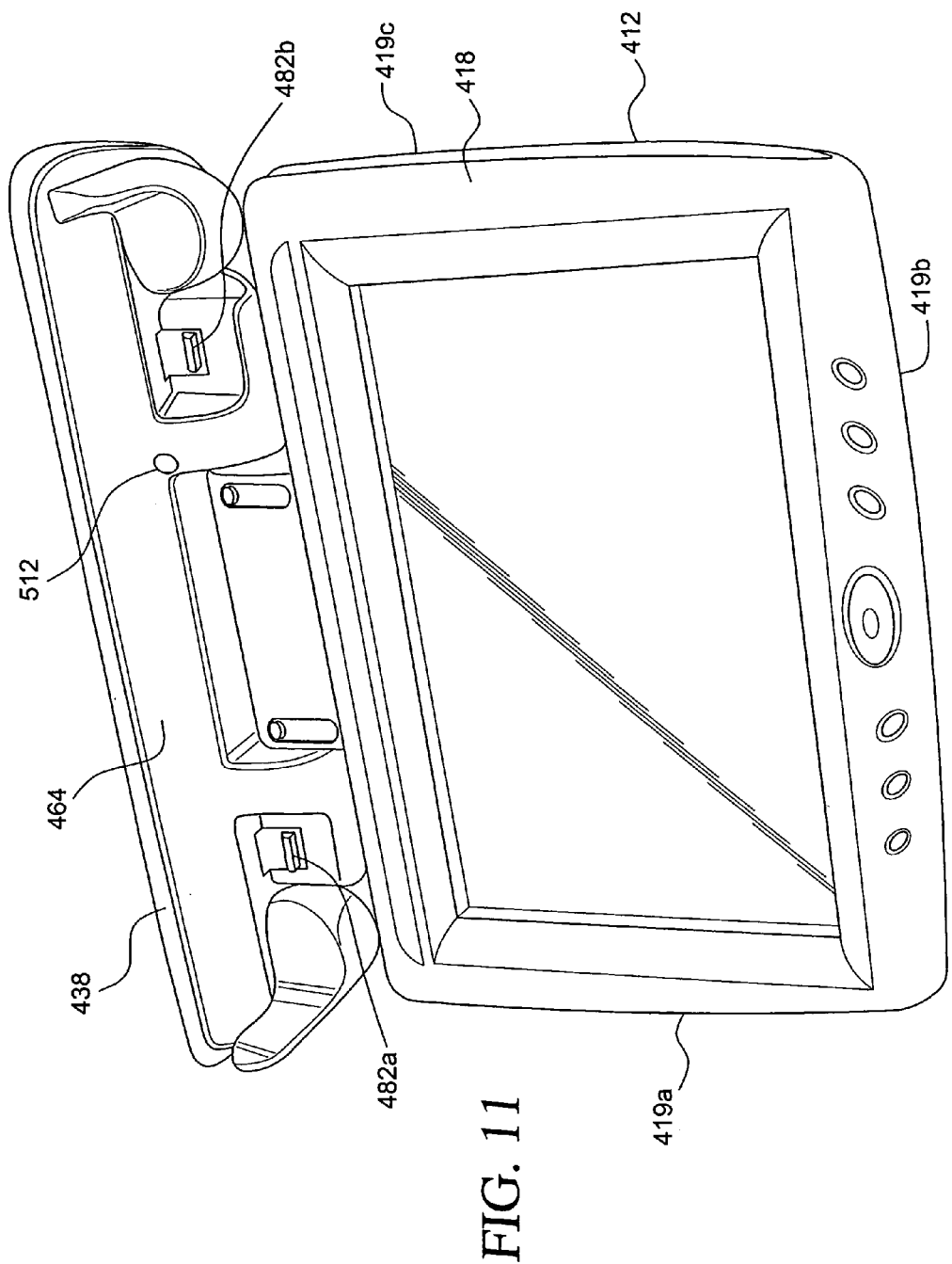

Referring to FIGS. 9, 10 and 11, an alternate embodiment of the structure for attaching the video system 412 to the cradle 438 is disclosed. In accordance with this embodiment, the base 464 includes first and second projecting attachment members 470a, 470b shaped and dimensioned to engage respective first and second apertures 476a, 476b formed in the cradle 438. The first and second projecting attachment members 470a, 470b each include an upwardly extending post 472a, 472b with a resilient spring latch 474a, 474b formed thereon. As will be discussed below in greater detail, the spring latches 474a, 474b are actuated to control passage through the respective first and second apertures 476a, 476b during installation and removal.

As those skilled in the art will certainly appreciate, the first and second projecting attachment members 470a, 470b will only provide limited support. As such, the video system 412 is provided with eccentric shaped first and second locking members 478a, 478b and the cradle 438 is similarly provided with eccentric shaped first and second locking apertures 480a, 480b. The first and second locking members 478a, 478b are shaped to pass through respective first and second locking apertures 480a, 480b formed in the cradle when the shapes of the first and second locking members 478a, 478b and the first and second locking apertures 480a, 480b align. Once the first and second locking members 478a, 478b are passed through the first and second locking apertures 480a, 480b, the first and second locking members 478a, 478b are rotated such that the shape of the first and second locking members 478a, 478b no longer align with the first and second locking apertures 480a, 480b, and the video system 412 is thereby locked relative to the cradle 438.

As with the prior embodiment, and referring to FIGS. 9, 10 and 11, the attachment mechanism is further enhanced with first and second safety buttons 482a, 482b associated with the first and second projecting attachment members 470a, 470b. The first and second safety buttons 482a, 482b respectively control actuation of the spring latches 474a, 474b extending from the projecting attachment members 470a, 470b so that the video system 412 may not be removed until the respective safety buttons 482a, 482b are simultaneously actuated. In particular, the first and second safety buttons 482a, 482b cause controlled expansion and/or contraction of the spring latches 474a, 474b to permit or restrict passage of the spring latches 474a, 474b through the first and second apertures 476a, 476b. In accordance with a preferred embodiment, the safety buttons 482a, 482b control expansion and/or contraction of the spring latches 474a, 474b by selectively drawing the spring latches 474a, 474b inward in a manner making them narrower, and thereby allowing for passage through the first and second apertures 476a, 476b. When the safety buttons 482a, 482b are not actuated the spring latches 474a, 474b extend outwardly in a manner preventing passage of the spring latches 474a, 474b through the first and second apertures 476a, 476b. Although a preferred technique is disclosed herein, other techniques could certainly be employed without departing from the spirit of the present invention.

In accordance with yet a further embodiment of the present invention, and with reference to FIG. 9, third and fourth safety buttons 484a, 484b are associated with the first and second locking members 478a, 478b and prevent rotation of the first and second locking members 478a, 478b until the first and second safety buttons 484a, 484b are simultaneously actuated. This embodiment also includes a tensioning mechanism 512 with a handle friction plate 512a and handle 512b. Although the various embodiments for the safety buttons are shown in a single FIGURE, those skilled in the art will appreciate they may be used together or separately without departing from the spirit of the present invention.

More particularly, and as will be discussed below in greater detail, the cradle is secured to a lateral beam running along the roof of the automobile. With this in mind, the orientation of the fastening mechanism components is critical to the operation and installation of the present video system. More particularly, the base 464 of the video system includes first and second projecting attachment members 470a, 470b shaped and dimensioned to engage respective first and second apertures 476a, 476b formed in the cradle 438. The base 464 of the video system 412 also includes eccentric shaped first and second locking members 478a, 478b and the cradle 438 is similarly provided with eccentric shaped first and second locking apertures 480a, 480b. Between the respective attachment members, locking members and apertures are electrical connections, which are discussed below in greater detail, linking the video system to the cradle (and the remainder of the automobile).

The spacing of the various fastening components relative to the electrical connections 442, 444 is critical to placement of the cradle 438, and ultimately the video system 412, along the beams, for example, the B-pillar 560 (see FIG. 15), formed in the roof of an automobile. With this in mind, the inner edge 481a, 481b, 479a, 479b of the outer most fastening component, for example, the respective inner edges 481a, 481b of the locking apertures 480a, 480b or the respective inner edges 479a, 479b of the locking members 478a, 478b, is preferably approximately ⅛ inch to approximately 7 inches from the respective outer edge 443a, 443b, 445a, 445b of the electrical connection 442, 444, and more preferably approximately 2 inches to approximately 4 inches from the outer edge 443a, 443b, 445a, 445b of the electrical connection 442, 444. It should be understand these distances are from adjacent fastening components to the outer edge of the electrical components. As such, and more particularly in accordance with a preferred embodiment, the respective inner edges 481a, 481b of the first and second locking apertures 480a, 480b are preferably approximately ⅛ inch to approximately 7 inches from the respective first and second outer edges 443a, 443b of the electrical connections 442, and more preferably approximately 2 inches to approximately 4 inches from the respective first and second outer edges 443a, 443b of the electrical connections 442. Similarly, the respective inner edges 479a, 479b of the locking members 478a, 478b are preferably approximately ⅛ inch to approximately 7 inches from the respective first and second outer edges 445a, 445b of the electrical connection 444, and more preferably approximately 2 inches to approximately 4 inches from the respective first and second outer edges 445a, 445b of the electrical connection 444.

As with the embodiment disclosed above with reference to FIGS. 1 to 4, the base 464 of the video system 412 is mounted to a cradle 438 formed within the ceiling 413 of the automobile 411 in a manner that permits rotation of the video housing 418 about multiple axes. More particularly, the base 464 includes a first hinge 466 that facilitates rotation of the video housing 418 about an axis substantially parallel to the ceiling 413 of the automobile 411 for movement from its storage (or up) position to a downward use position for viewing thereof. In an effort to provide for controlled rotation of the video monitor 416 about an axis substantial parallel to the ceiling of the automobile, the first hinge 466 is provided with a rotation control mechanism 520. In addition, to limiting movement of the video system 412, in particular, the housing 418, about the first hinge 466, the rotation control mechanism 520 adjusts the storage position of the video system 412 for alignment with the ceiling 413, in particular, the headliner 494, of the automobile 411. This adds to the versatility of the present system in that each automobile has a slightly different, and oftentimes drastically different, ceiling profile. As such, the present rotation control mechanism 520 allows for ready adjustment of the present video system 412 permitting optimized installation and usage of the present system.

Figure 12:
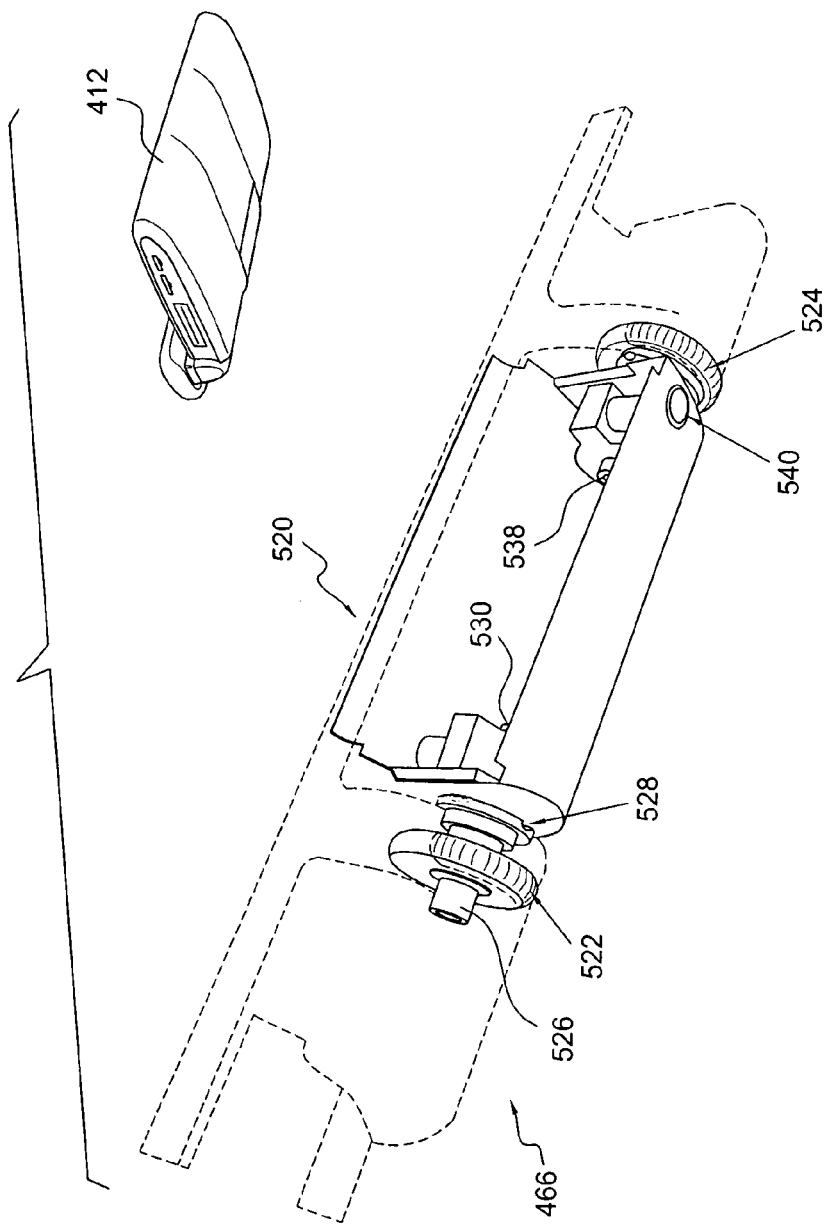
FIG. 12 is a perspective view of the rotation control mechanism, in its up (or storage) position, of the video system shown with reference to FIGS. 9, 10 and 11.
Figure 13:
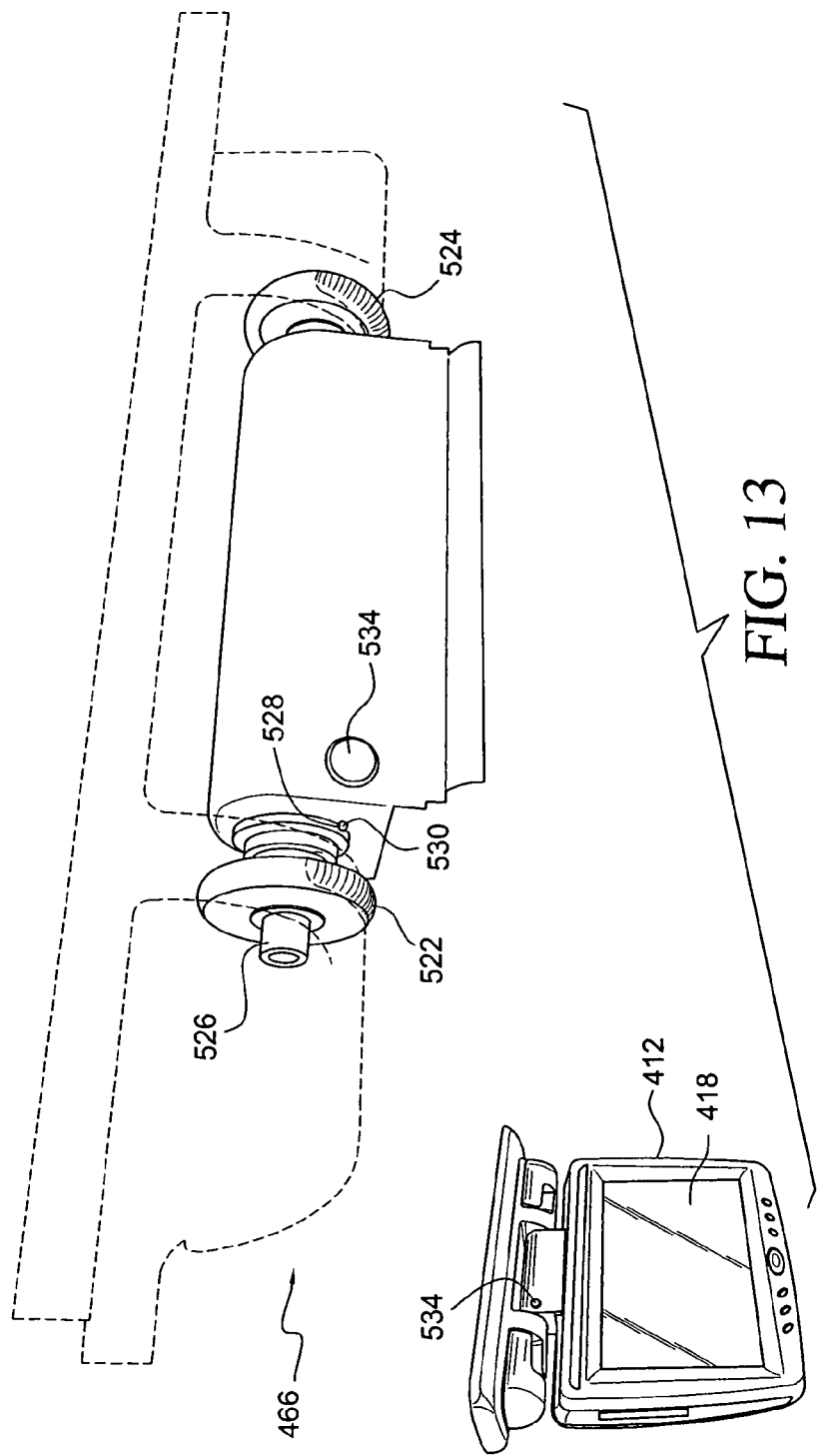
FIG. 13 is a perspective view of the rotation control mechanism in its down (or use) position, of the video system shown with reference to FIGS. 9, 10 and 11.
Figure 14:
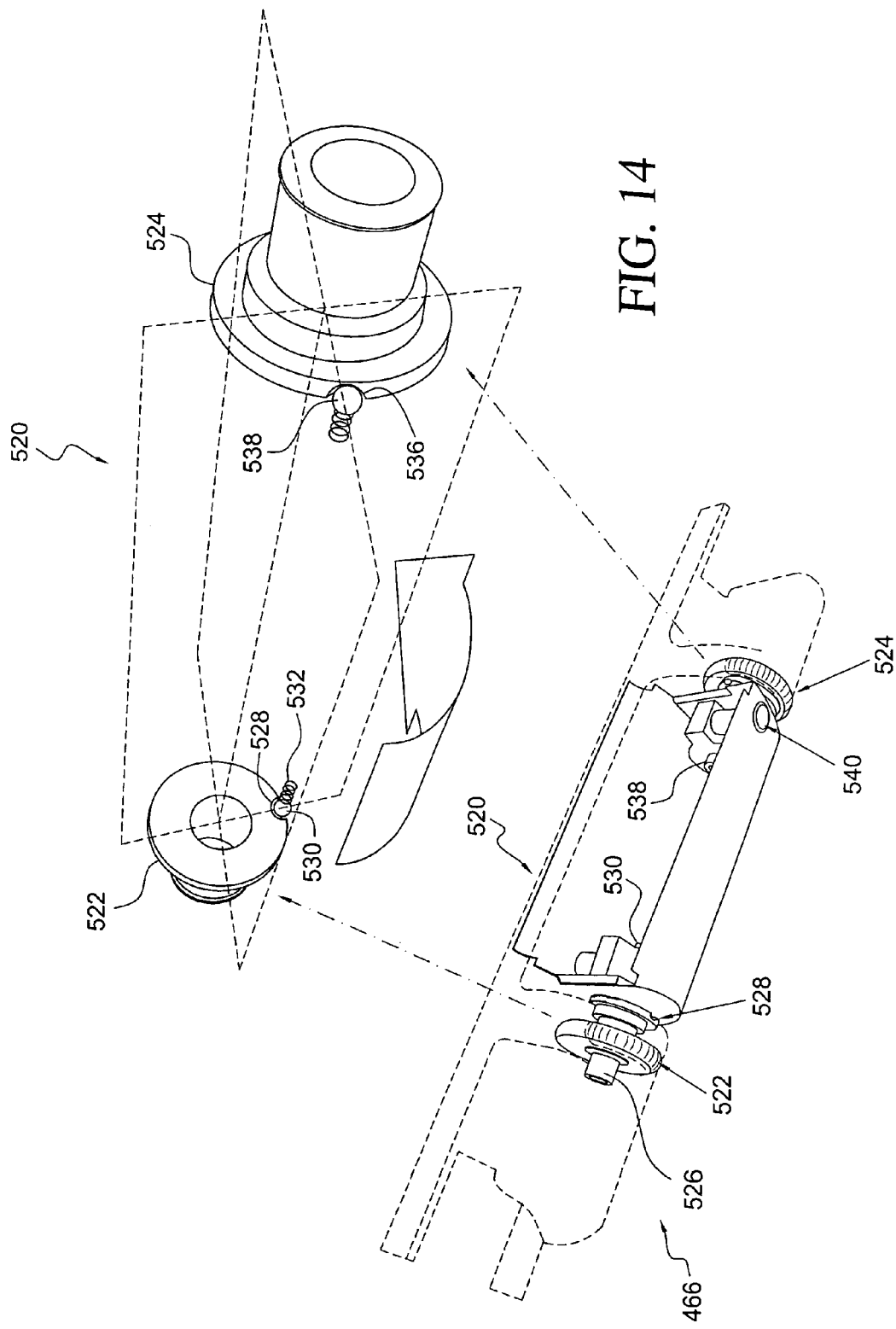
FIG. 14 is a schematic showing operation of the rotation control mechanism shown in FIGS. 12 and 13.

With this in mind, and with reference to FIGS. 12, 13 and 14, the rotation control mechanism 520 of the first hinge 466 includes a first detent adjustment wheel 522 designed for limiting the position of the video system 412 as it is moved to its use position and a second detent adjustment wheel 524 designed for limiting the position of the video system 412 as it is moved to its storage position. Both the first detent adjustment wheel 522 and the second detent adjustment wheel 524 are in alignment with the pivot pin 526 of the first hinge 466, providing an ideal location for control of the rotation of the video system.

A first detent notch 528 is associated with the first detent adjustment wheel 522. The first detent notch 528 is shaped and dimensioned to interact with a first detent 530 extending laterally from the housing 418 and in substantial alignment for interaction with the first detent notch 528. As such, when the housing 418 of the video system 412 is rotated about the first hinge 466 toward its downward use position, the first detent 530 will ultimately contact the first detent notch 528, seat therein and substantially prevent further movement of the housing 418. As those skilled in the art will certainly appreciate, it may be desirable to provide multiple viewing angles when the housing 418 is in its use position. With this in mind, the first detent adjustment wheel may be provided with multiple detent notches in which the first detent is selectively seated based upon the desired viewing angle.

In accordance with a preferred embodiment, the first detent 530 is biased by spring 532 toward the first detent notch 528. Release, thereof, is provided by a button 534 linked to the first detent 530 permitting withdrawal of the first detent 530 from the first detent notch 528.

With regard to the second detent adjustment wheel 524, it includes a second detent notch 536 associated therewith. The second detent notch 536 is shaped and dimensioned to interact with a second detent 538 extending laterally from the housing 418 and in substantial alignment for interaction with the second detent notch 536. As such, when the housing 418 of the video system 412 is rotated about the first hinge 466 toward its storage position, the second detent 538 will ultimately contact the second detent notch 536, seat therein and substantially prevent further movement of the housing 418. In accordance with a preferred embodiment, the second detent 538 is biased by a spring 539 toward the second detent notch 536. Release, thereof, is provided by a button 540 linked to the second detent 538 permitting withdrawal of the second detent 538 from the second detent notch 536.

The first and second adjustment wheels 522, 524 are secured to the first hinge 466 for movement relative thereto for ultimately controlling the position of the first and second detent notches 528, 536. As such, the first and second adjustment wheels 522, 524 are designed to permit selective rotation relative to the first hinge 466 for adjusting the desired stop points, but are generally fixed during usage thereof such that as the housing 418 of the video system 412 is rotated about the first hinge 466, the stop points will remain consistent and reliable.

Figure 48:
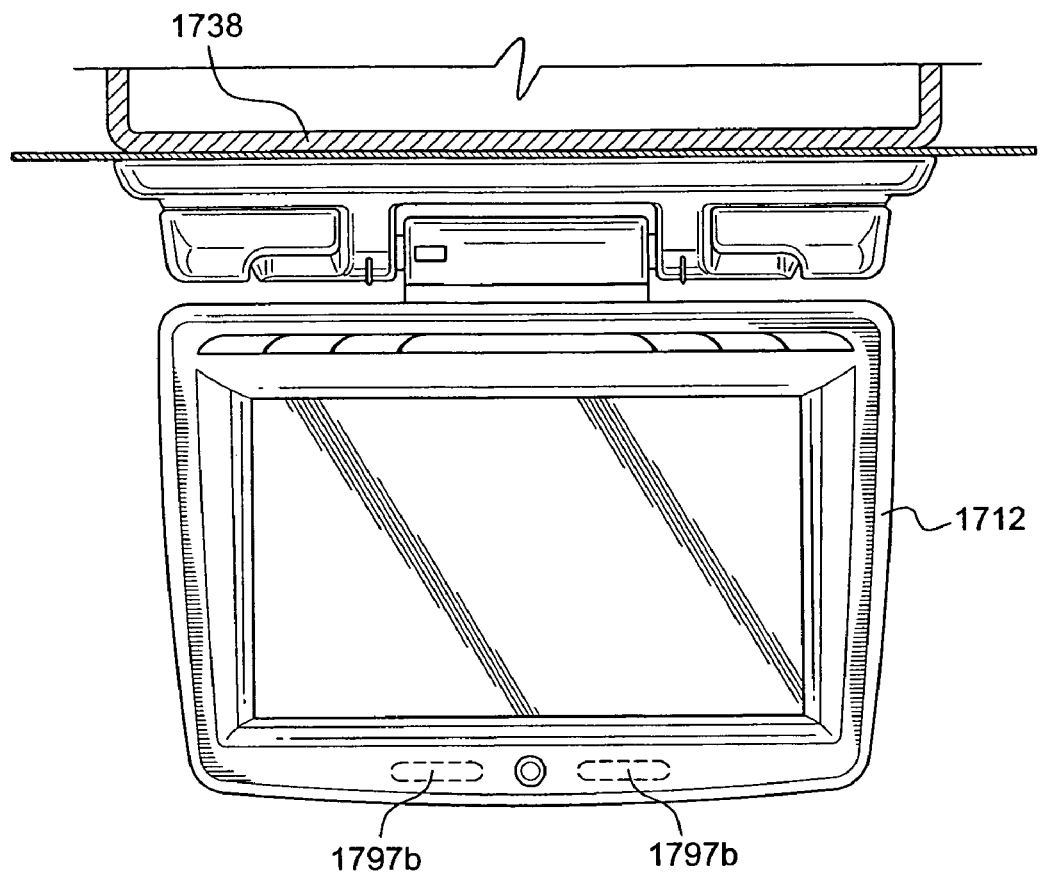
FIG. 48 is a front plan view of the video system and cradle in accordance with the present invention.
Figure 49:
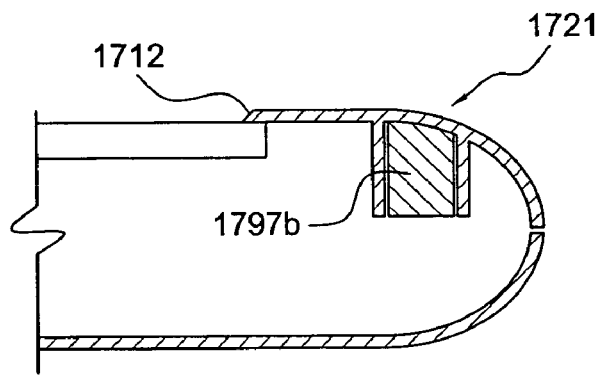
FIG. 49 is a cross sectional view of the video system shown in FIG. 48.
Figure 50:
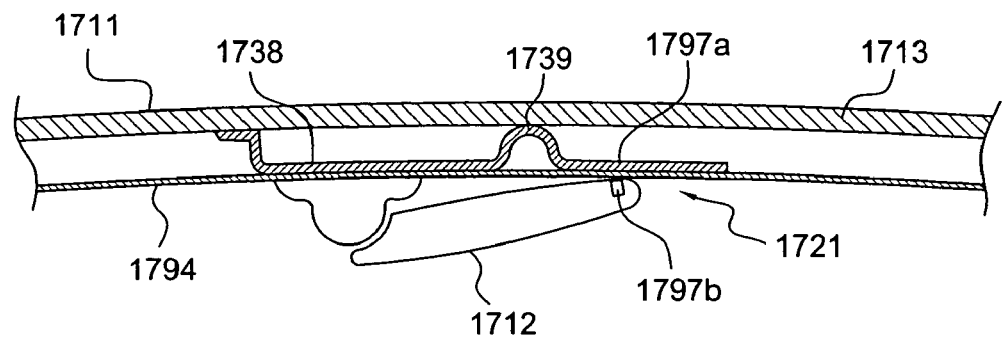
FIG. 50 is a cross sectional view showing the embodiment of FIGS. 48 and 49 installed within the ceiling of an automobile.

In addition to the use of the rotation control mechanism 520 described above, it is contemplated a retaining mechanism, for example, a magnet system, 1721 may be used to hold the video system 1712 close to the headliner 1794 of the automobile 1711. That is, the retaining mechanism maintains the video system 1712 adjacent the headliner 1794 and the cradle 1738 when it is in its storage position. Such a system will help in preventing shaking and other undesirable movement of the video system 1712. In particular, and with reference to FIGS. 48, 49 and 50, the mounting bracket 1739 securing the cradle 1738 adjacent the ceiling 1713, and ultimately the video system 1712, is provided with a magnetically active metal portion 1797a that aligns with magnets 1797b formed in the video system 1712 when the video system 1712 is rotated to its storage position. By providing the magnetically active metal portion 1797a and the magnets 1797b in this manner, the video system 1712 is held close to the headliner 1794 of the automobile 1711 when in its storage position.

Figure 51:
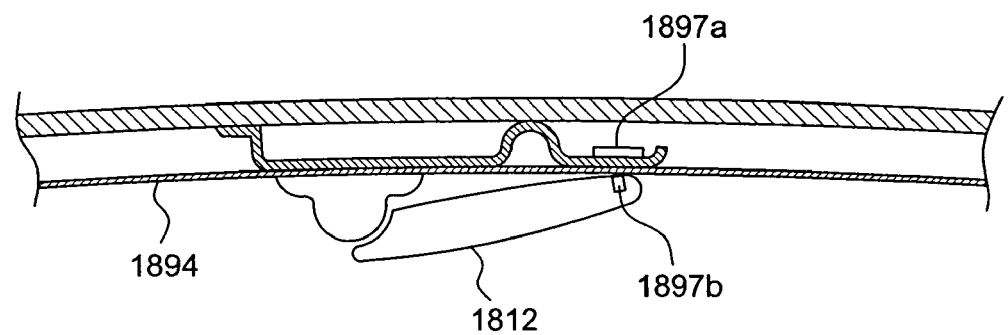
FIGS. 51 and 52 are cross sectional views showing various mounting structures for use in accordance with the present invention.
Figure 52:
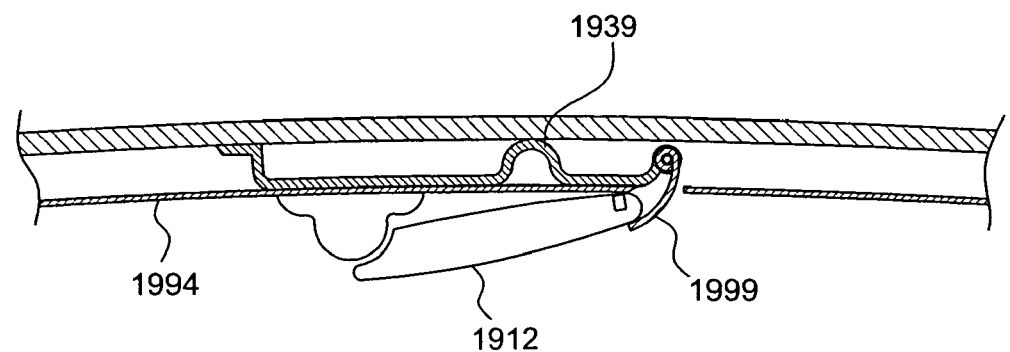

Referring to FIGS. 51 and 52, it is further contemplated other mechanisms for holding the video system close to the headliner may be employed. With reference to FIG. 51, the conventional magnets disclosed with reference to FIGS. 48, 49 and 50, may be replaced with electromagnets 1897a, 1897b. As such, when it is sensed that the video system 1812 is rotated to within, for example, two inches of the headliner 1894, the electromagnets 18997a, 1897b within the headliner 1894 and the video system 1812 are activated to drawn the video system 1812 toward the headliner 1894 such that it is securely stored at its storage position.

In accordance with an alternate embodiment, and with reference to FIG. 52, a latch 1999 is provided for extension from the cradle 1939 and through the headliner 1994. The latch 1999 is designed to rotate forward to a position for engaging the video system 1912 when the video system 1912 is rotated to its storage position.

The base 464 further includes a second hinge 468 that permits rotation of the video housing 418 about an axis substantially perpendicular to the axis of the first hinge 466. As such, the second hinge 468 allows for rotation of the video housing 418 in a manner that facilitates viewing of the video monitor 416 from opposite sides of the automobile 411. The video system 412 is, therefore, designed for rotation about multiple axes and may be freely rotated to improve viewing regardless of where the video system 412 is being used.

In addition to the provision of a rotation control mechanism associated with the first hinge 466, the hinge structure also includes a tensioning mechanism 512. The tensioning mechanism 512 is designed to permit free rotation of the video system 512 when desired, but apply preselected tension to the first hinges 466 for controlling vibration of the video system 412 as the automobile moves and vibrations are transmitted throughout the automobile. In addition to preventing the transmission of vibrations to the video system 412, the tensioning mechanism 512 also allows for controlled positioning of the video system 412 at a variety of angular orientations by simply releasing and reapplying the tensioning mechanism 512. In accordance with a preferred embodiment of the present invention, the tensioning mechanism 512 includes a friction plate 512a that selectively engages the first hinge 466 to hold the video system 412 in a desired orientation. The friction plate 512a is attached to a handle 512b that allows the user to move the friction plate 512a between a tensioned orientation and an untensioned orientation. Similar frictional plates (not shown) are associated with the second hinge for maintaining desired positioning. As those skilled in the art will appreciate, a similar tensioning mechanism may be applied to the second hinge 468.

As those skilled in the art will certainly appreciate, cradle based electronic devices are often confronted with the problem of people attempting to link non-compatible electronic products. Although this is sometimes acceptable as the products being linked are minimally compatible, this often results in problems due to non-compatible power supplies or signal processing protocols. With this in mind, the present cradle 438/video system 412 has been developed so as to ensure only approved and compatible video systems may be used when placed within a cradle manufactured in accordance with the present invention. In particular, the cradle 438 is provided with an RF identification transceiver 542 that interacts with a similar RF identification transceiver 544 mounted within, for example, the base 464 of the video system 412. As such, the electrical connections 442 of the cradle 438 are linked to the RF identification transceiver 542 and will remain closed until a video system 412 with an appropriate RF identification transceiver 544 is placed within the cradle 438.

Controlled use of the cradle and video system may further be achieved via direct electrical communication between the cradle and the video system. In particular, and in accordance with an alternate embodiment of the present invention, the cradle and video system could be provided with respective electrical connections that permit usage only when the electrical connection is complete.

As with embodiment described with reference to FIGS. 1 to 4, the cradle 438 is shaped and dimensioned for receiving and securing the video system 412 to the ceiling of the automobile. As those skilled in the art will certainly appreciate, similar cradles may be provided at other locations permitting use of the video system 412 at other remote locations.

Figure 15:
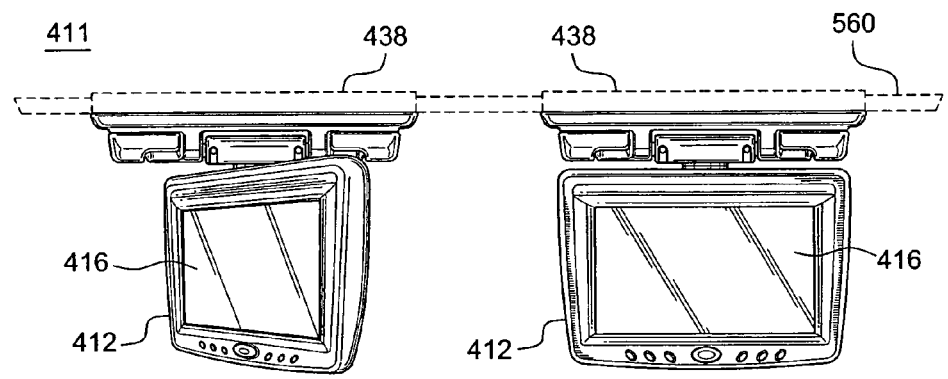
FIGS. 15, 16, 17, 18 and 18a show various multiple video system embodiments in accordance with the present invention.

With this in mind, and with reference to FIG. 15, various cradles 438 may be mounted within an automobile for receiving video systems 412 in a manner permitting viewing from different locations within the automobile. For example, cradles 438 may be positioned along the same B-pillar 560 at laterally spaced positions within the automobile as shown in FIG. 15 and/or cradles may be positioned along different B-pillars spaced along the length of the automobile.

Figure 16:
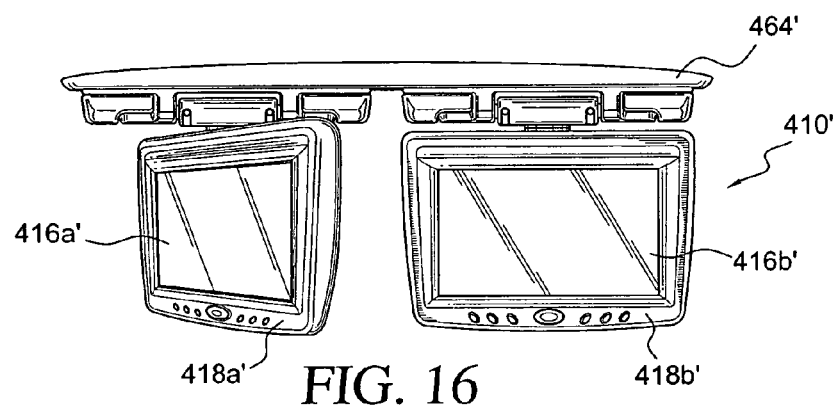
Figure 18A:
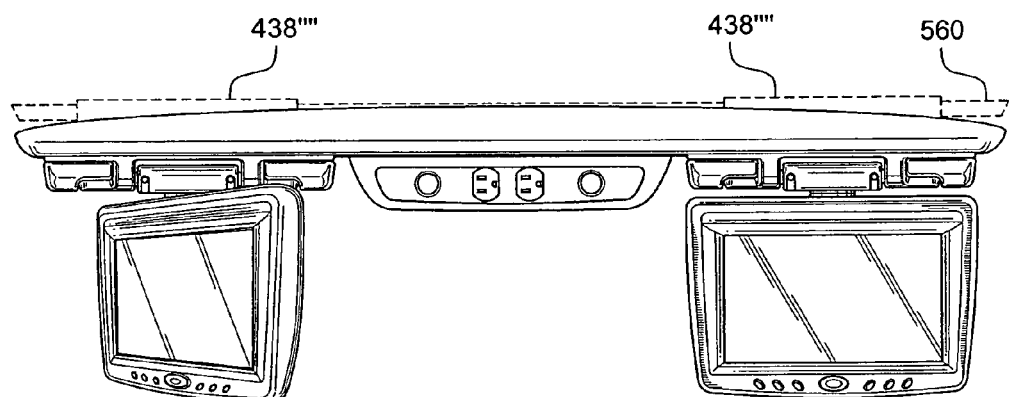
Figure 17:
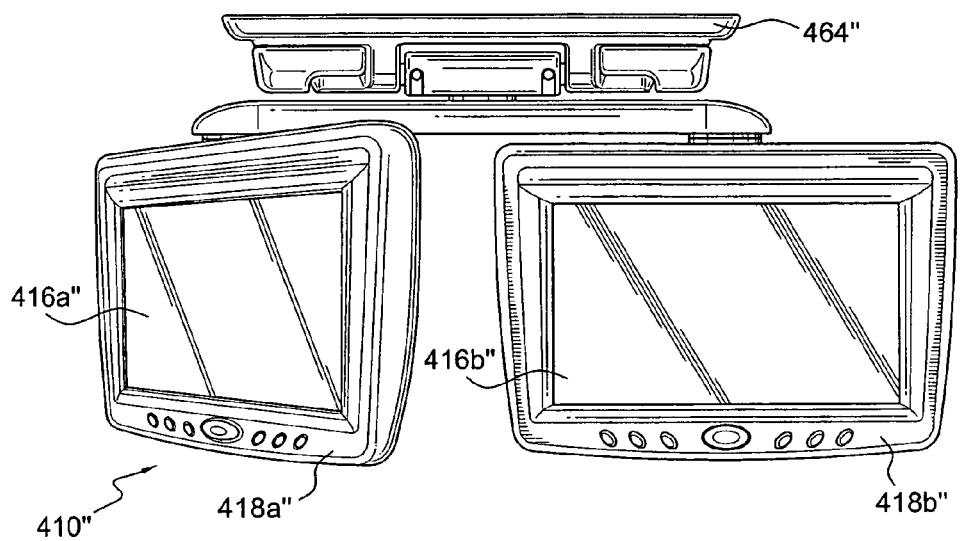
Figure 18:
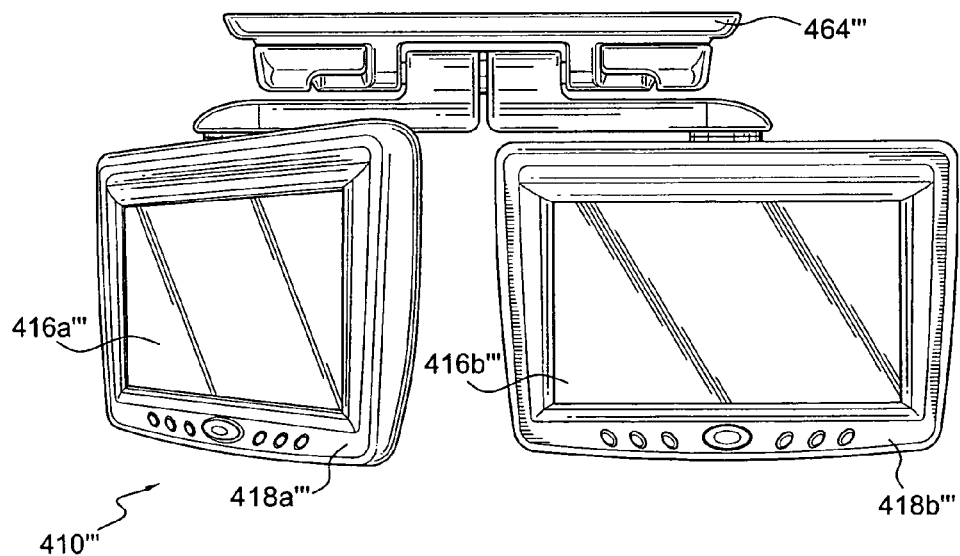

In addition, it is likely people sitting on opposite sides of the vehicle will be interested in watching different videos. As such, a dual monitor system 410', 410", 410''' is contemplated in accordance with the present invention as shown with reference to FIGS. 16, 17 and 18. The dual monitor systems 410', 410", 410''' include respective first and second monitors 416a', 416a", 416a''', 416b', 416b", 416b''' and first and second video sources (not shown) mounted with first and second housings 418a', 418a", 418a''', 418b', 418b", 418b'''. Each of the housings 418a', 418a", 418a''', 418b', 418b", 418b''' is linked to a single base 464', 464", 464''' from which the first and second housings 418a', 418a", 418a''', 418b', 418b", 418b''' extend. Pivotal connections linking the first and second housings 418a', 418a", 418a''', 418b', 418b", 418b''' to the base 464', 464", 464''' allow for rotation of the first and second housings 418a', 418a", 418a''', 418b', 418b", 418b''' between a storage positioned and a use position. Referring to FIG. 18a, a dual monitor system 410'''' may be provided which connects with two cradles 438'''' mounted along the same B-pillar 560''''.

The cradle 438 includes quick release electrical connections 442 for the audio input, audio output, video input, video output and power supply (although one embodiment contemplates a system which connects only to a power supply). The video system 412, and particularly, the base 464 of the video system 412, includes mating electrical connections 444 for transmitting electricity and a/v signals between the cradle 438 and the video system 412.

In addition to the electrical connections provided on the cradle 438, and as was discussed above, the cradle 438 also includes a various fastening apertures 476a, 476b, 480a, 480b adapted for selective engagement with the attachment members 470a, 470b, 478a, 478b of video system 412.

As with the prior embodiment, the usefulness of the present invention is enhanced by the fact that the cradle 438 is substantially recessed within the ceiling 413 of the automobile 411. More particularly, each cradle 438 installed with an automobile 411 is positioned such that the face plate 492 is substantially flush with the headliner 494, or other automobile surface, directly adjacent thereto. With this in mind, the cradle 438 is constructed with a metal mounting plate 496 directly secured to the ceiling 413, more particularly, the B-pillar 560 (see FIG. 15), of the automobile 411 and a ceiling docking port 498 secured thereto. The ceiling docking port 498 includes the electrical and mechanical components discussed above which allow for the direct attachment of the video system 412 thereto.

Regardless of which embodiment is employed, the installation of the cradle 138, 438 is intended to provide for an aesthetically pleasing appearance and the ceiling docking port 198, 498 is, therefore, provided with a face plate 192, 492 which substantially aligns with and is, therefore, flush with the headliner 194, 494 of the automobile 111. With this in mind, the following disclosure applies to both embodiments of the video system presented above, although only the first embodiment shown in FIGS. 1 to 4 is referenced herein. Aesthetics are further enhanced by the provision of a cover member 200, 200', 200" which may be selectively placed over the ceiling docking port 198 when it is not in use. With this in mind, the cover member 200, 200', 200" are designed to substantially conform with the color, fabric, texture etc. of the headliner 194, 494. The cover member is further designed to be substantially flush with the headliner and conform with the profile thereof.

The cover member 200, 200', 200" is preferably frictionally engaged with docking port 198 when positioned for covering. As such, and in accordance with a preferred embodiment, the cover member 200, 200', 200' is provided with snap connections 210, 210', 210" shaped and dimensioned for engagement with the cradle 138, 438.

Figure 19:
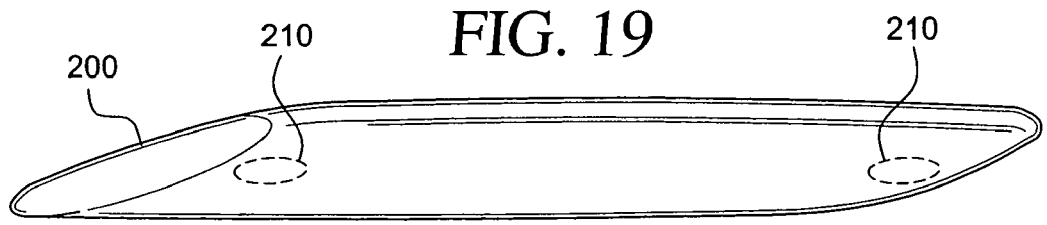
FIGS. 19, 20, 21 and 22 are perspective views of various covers which may be used in accordance with the present invention.
Figure 20:
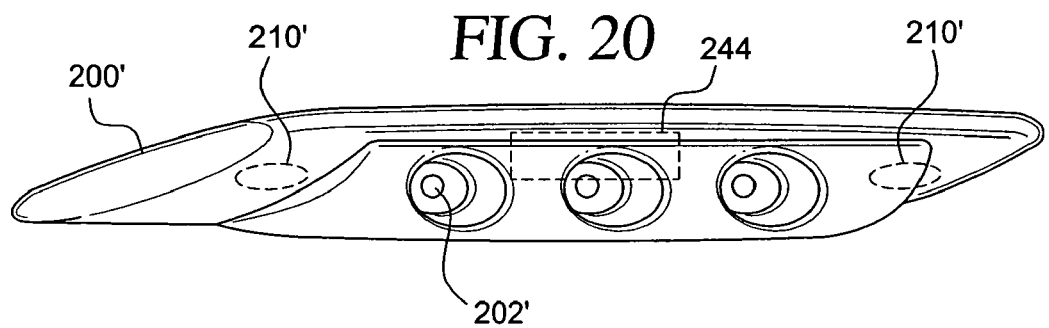
Figure 21:
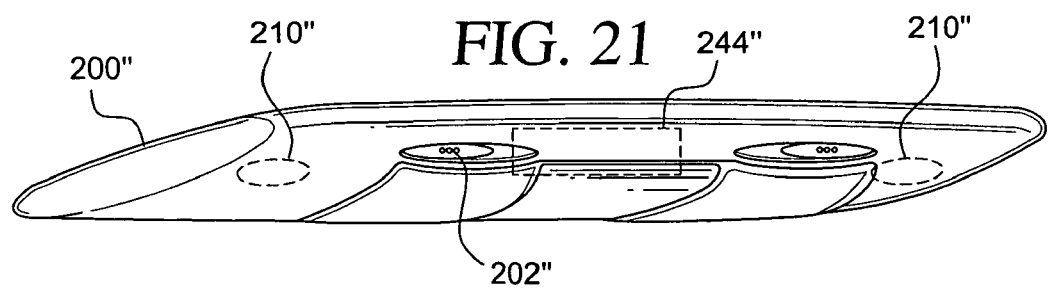

As shown with reference to FIGS. 19, 20 and 21, the cover member may be a simple cover 200 (see FIG. 19), a powered cover 200' with various power sources 202' extending therefrom (see FIG. 20) or an illuminating cover 200" with lights 202" (see FIG. 21). Where the covers require power, the cover is provided with an electrical connection 244', 244" allowing the cover 200', 200" to tap into the power supply of the cradle 438.

Figure 22:
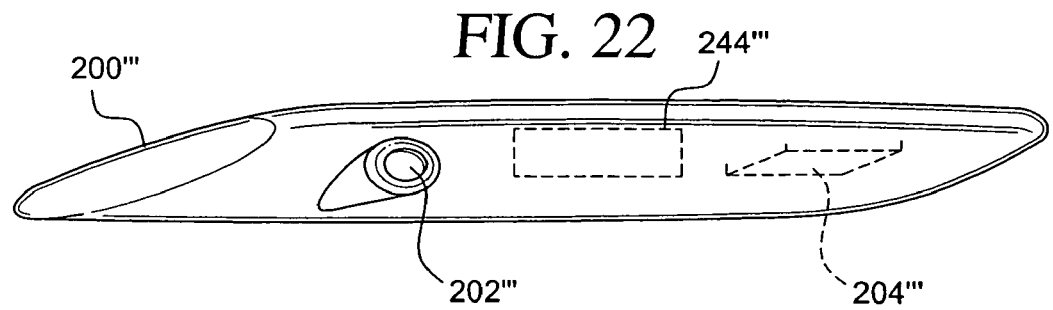

Another cover 200''' employing a rear seat, or baby, camera 202''' is also contemplated as shown in FIG. 22. The cover 200''' includes a rearwardly facing video camera 202''' linked to a video monitor either integrated within the rearview mirror of the automobile or independently mounted along the dash of the automobile. By utilizing this cover 200''', a driver may keep an eye on what is going on in the backseat of an automobile without constantly turning around to view the rear seats of the vehicle. As those skilled in the art will appreciate the video camera 202''' is linked to the video monitor via the electrical connections 244''' of the cover 200''' and the cradle 138, which are ultimately linked to the video monitor via wired or wireless means known to those skilled in the art. Similarly, and as discussed below in greater detail, the video monitor itself may be provided with a rearwardly facing video camera performing the same function as the video camera mounted within the cover.

The cover 200''' may also be provided with a Bluetooth processor 204''' programmed to interact with a variety of Bluetooth appliances that might be brought into the automobile. For example, the Bluetooth processor 204''' might provide for hands-free cell phone usage, wireless Internet access for those bringing a Bluetooth enable laptop into the automobile, etc. Additional functionalities may include, for example, and not limited to, those discussed herein with regard to the use of an expansion slot.

The aesthetically pleasing nature of the present embodiment is further enhanced by the provision of a "free floating" video system 112, 412. More particularly, and as discussed above when describing the various embodiments of the present video system 112, 412, the housing 118, 418 with the video monitor 116, 416 and video source 120, 420 housed therein depends from the base 164, 464 which is then mounted to the recessed cradle 138, 438 formed within the ceiling of the automobile. As such, the video system 112, 412 depends from the ceiling integrated cradle 138, 438 without the need for a surrounding support structure, allowing for the provision of a self-sufficient video system 112, 412. More particularly, when the video system 112, 412 is rotated to its storage position, it is substantially parallel and adjacent the headliner 194, 494 with no support structure surrounding the unattached outer perimeter, that is, the free side edges 119*a-c*, 419*a-c* to which the base 164, 464 is not attached, of the housing 118, 418. This improves the aesthetics of the video system 112, 412 and does not require that a substantial portion of the headliner 194, 494 be covered or cut away to accommodate the installation thereof.

Figure 23:
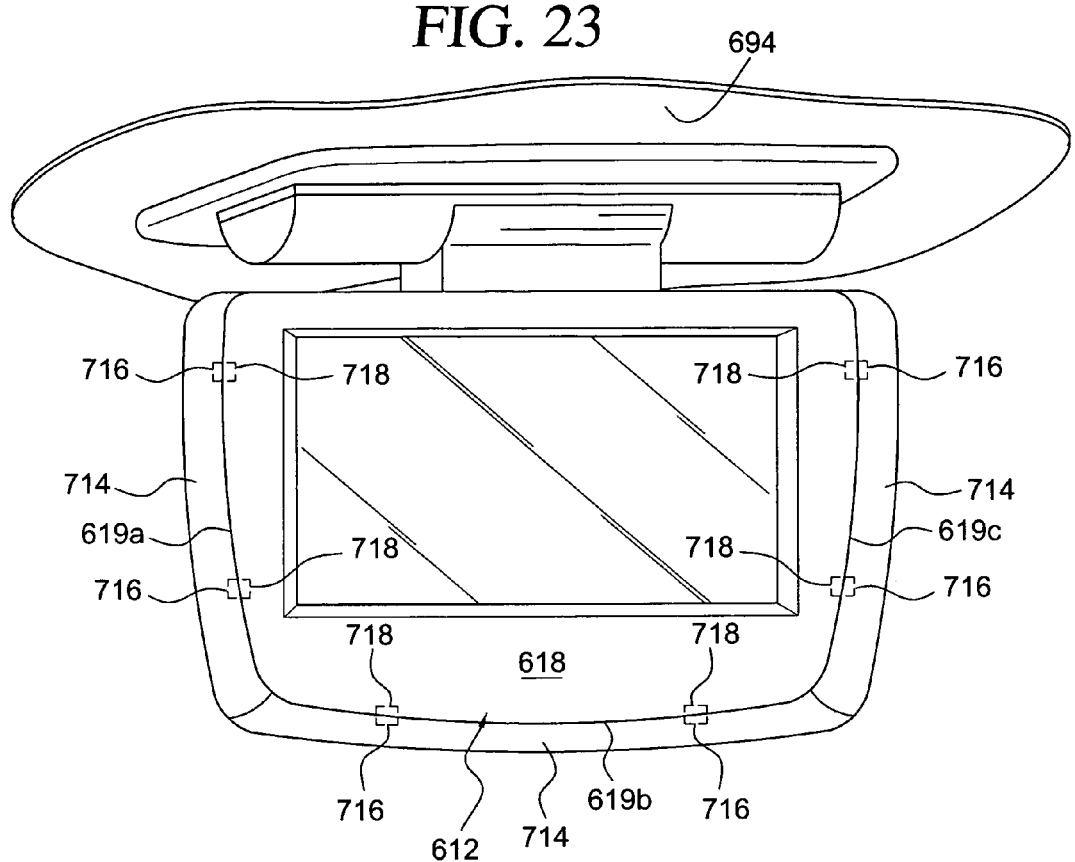
FIGS. 23 and 24 are perspective views of the video system with profile members secured thereto.
Figure 24:
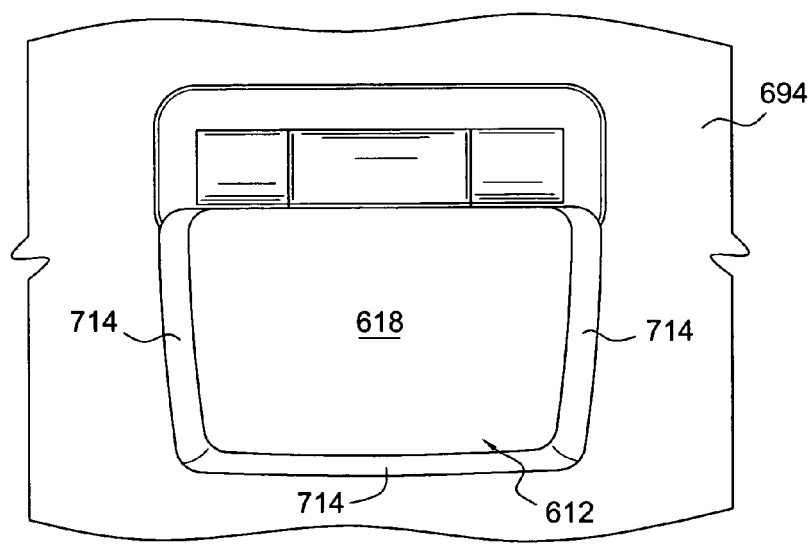

Referring to FIGS. 23 and 24, the "free floating" video system 612 of the present invention is further enhanced by providing selectively attachable profile members 714 to the free side edges 619*a-c* of the housing 618. The profile members 714 are designed to substantially conform to the headliner 694 shape of the vehicle such that when the video system 612 is rotated to its storage position as shown in FIG. 24, the video system 612 will substantially conform with the headliner 694 in an aesthetically pleasing manner.

By manufacturing the profile members 714 such that they are detachably secured to the housing 618, the video system 612 may be readily adapted to conform to the headliner 694 profile of a variety of vehicles by simply replacing the profile members 714. Selective attachment of the profile members 714 is achieved by the provision of mating coupling members 716, 718 formed along the connecting surfaces of the profile members 714 and the housing 618. While a variety of coupling members may be utilized in accordance with the present invention, the preferred coupling members will be engaging male and female latch members formed along the connecting surfaces of the profile members and the housing.

Figure 25:
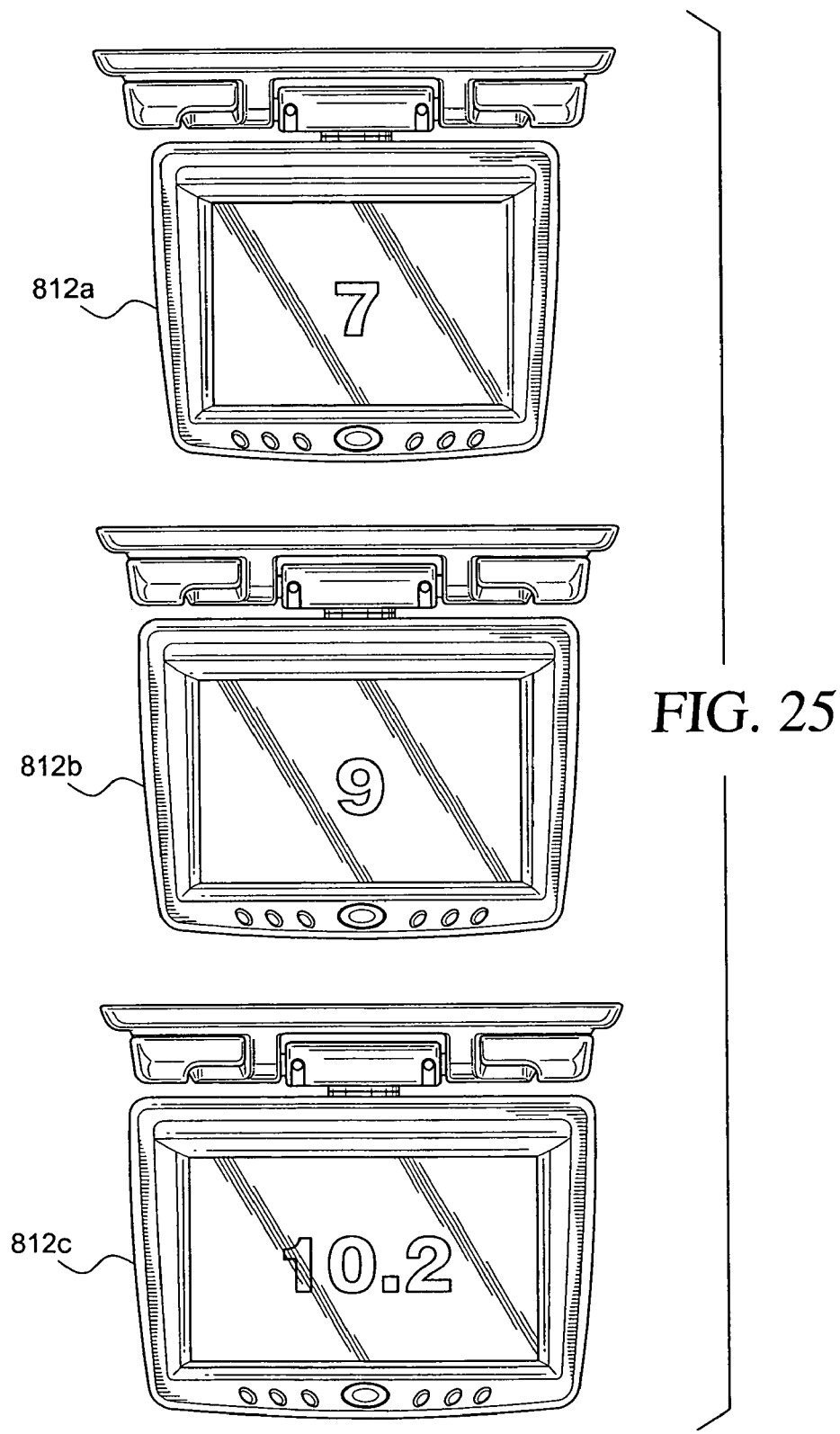
FIG. 25 shows various video monitors of different sizes which may be selectively used in accordance with the present invention.
Figure 26:
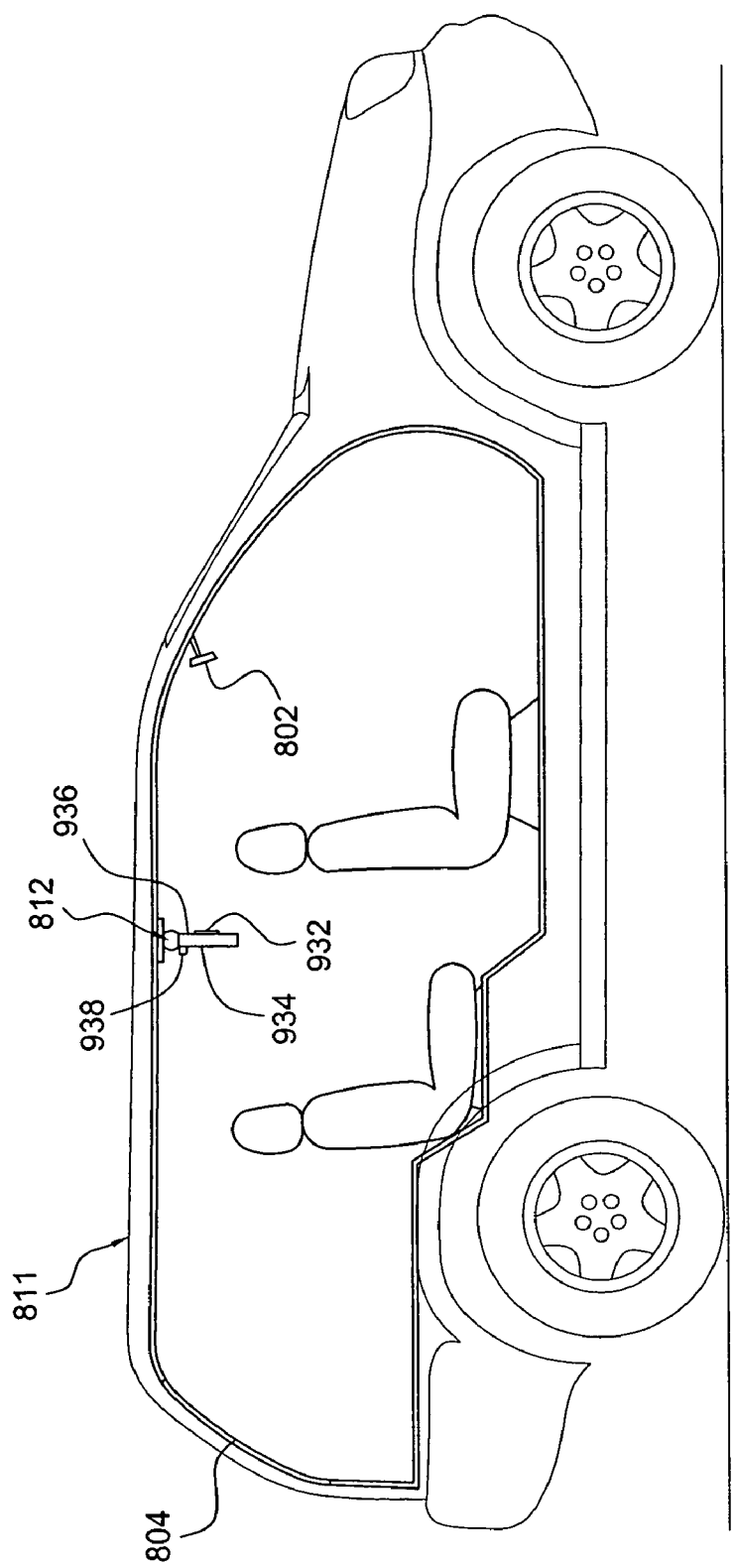
FIGS. 26, 27 and 28 show the use of a forward facing video monitor in accordance with the present invention.
Figure 27:
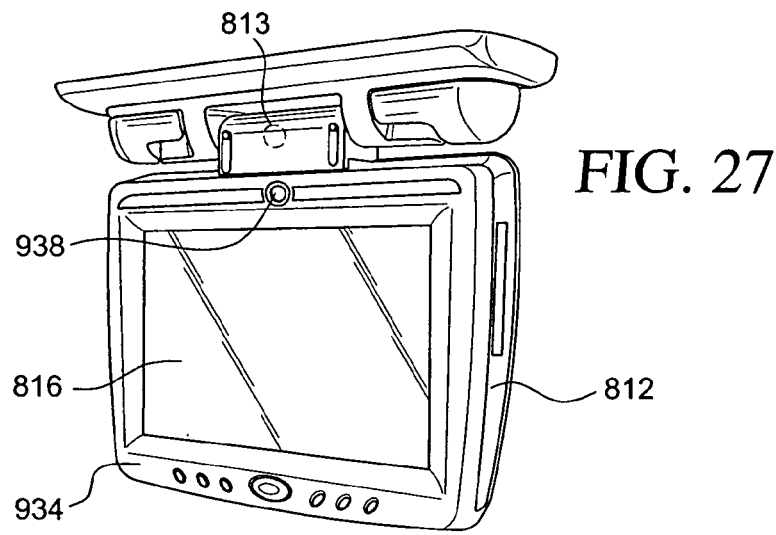
Figure 28:
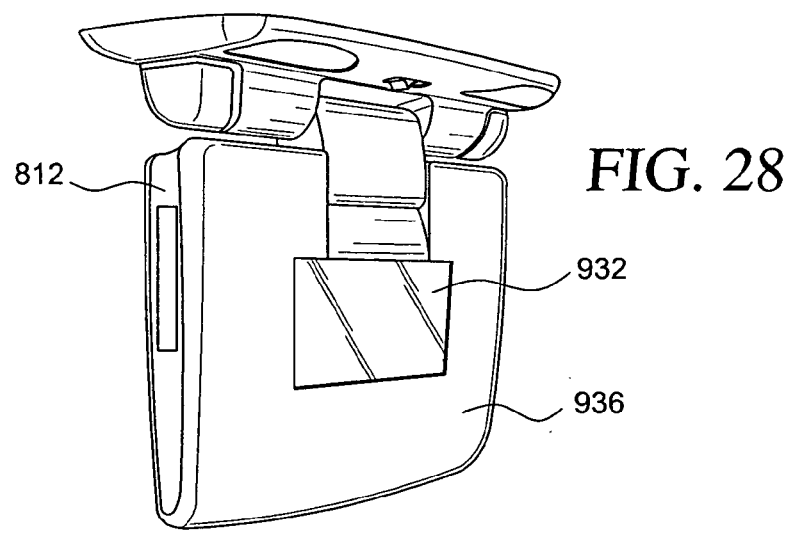

In addition to the aesthetically pleasing nature of a "free floating" video system, the fact that no support structure surrounds the video system allows for the ready replacement of the video system with other video systems 812*a*, 812*b*, 812*c* of differing sizes and shapes (see FIG. 25). As such, a driver may choose to use various different video systems of different sizes depending upon the needs of the driver. Similarly, a dealer or installer can sell the same system at different prices depending upon the size of the monitor required by the customer.

As a user replaces the present video system 812 with a larger video system, it might be found that the larger video system 812 blocks the driver's view as he or she looks through the rearview mirror 802 of the automobile 811. With this in mind, the video system 812 is provided with a rearwardly facing video camera 938, 938*a* and a forward facing video monitor 932.

More particularly, and referring to FIGS. 26 to 29, the video system 812 includes a rear facing surface 934 from which the video monitor 816 discussed above projects images for viewing by passengers of the automobile 811. The video system also includes a front facing surface 936. A forward facing video monitor 932 is provided on the front facing surface 936 for alignment with the rearview mirror 802 and viewing by the driver when the video system 812 is in its use position.

Figure 29:
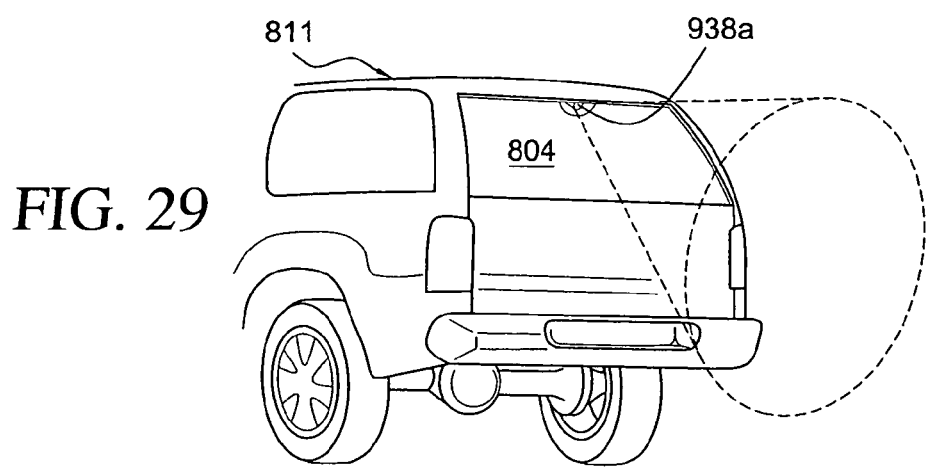
FIG. 29 shows an alternate embodiment of a camera for use in conjunction with the forward facing video monitor in accordance with the present invention.

In accordance with a preferred embodiment of the present invention, the forward facing video monitor 932 is linked to a video camera 938 mounted along the rear facing surface 934 of the video system 812 (see FIGS. 26 to 28) or a video camera 938*a* mounted along the rear portion 940 of the automobile 811 (see FIG. 29). As such, and when the video system 812 is rotated to its use position, the system is activated and the video camera 938, 938*a* is positioned to look out the rear window 804 of the automobile 811. The image generated by the video camera 938, 938*a* is then transferred to the forward facing video monitor 932 where the driver may look at the image as he or she looks in the rearview mirror 802.

In order to ensure proper usage of the rearview video camera 938, 938*a*, activation of the system (that is, the video camera 938, 938*a* and the forward facing video monitor 932) is linked to rotation of the video system 812 from a storage position substantially parallel with the ceiling of the automobile 811 to a use position rotated away from the ceiling of the automobile. More particularly, the video system 812 is provided with a switch 813 that identifies rotation from a storage position to a use position and accordingly activates the video camera 938, 938*a* and forward facing video monitor 932 for viewing behind the automobile 811. As those skilled in the art will certainly appreciate, the video cameras 938, 938*a* may be used in tandem are separately.

Further to the problems associated with the desire to place large monitors within an automobile, it is contemplated the video camera discussed above with reference to FIGS. 26 to 29 may be linked to a video monitor positioned for direct viewing by the automobile driver. In accordance with such an embodiment, the video monitor would be integrated within the rearview mirror of the automobile so that the driver will need only look to the rearview mirror in the manner he or she would normally look to the rearview mirror for viewing behind the automobile.

It is further contemplated the video camera 938 within the video system 812 may be positioned to monitor the back seats of the vehicle in addition to, or in conjunction, with the rearview traffic. This could be achieved by moving the camera 938, or utilizing multiple cameras, such that both views of the rearview traffic and the backseats are shown upon the forward facing video monitor 932.

Referring once again to the embodiment disclosed with reference to FIGS. 1 to 4, although these features apply equally to the other embodiments presented throughout the present disclosure, cables 132 extend through the ceiling 113 and the cradle 138. These cables 132 ultimately link audio, video and power to the cradle 138 and video system 112. More specifically, the cradle 138 and video system 112 are electrically connected to the remainder of the automobile 111 via electrical communication lines in a manner known to those skilled in the art.

Specific wiring arrangements and linking of various video systems within an automobile in accordance with preferred embodiments of the present invention are disclosed in U.S. patent application Ser. No. 10/920,425, entitled "AUTOMOBILE ENTERTAINMENT SYSTEM", filed Aug. 18, 2004, which is incorporated herein by reference, U.S. patent application Ser. No. 10/895,111, entitled "AUTOMOBILE ENTERTAINMENT SYSTEM", filed Jul. 21, 2004, which is incorporated herein by reference, U.S. patent application Ser. No. 10/895,110, entitled "AUTOMOBILE ENTERTAINMENT SYSTEM LINKING MULTIPLE VIDEO SYSTEM FOR COORDINATED SHARING OF VIDEO CONTENT", filed Jul. 21, 2004, which is incorporated herein by reference, U.S. patent application Ser. No. 10/895,086, entitled "HOUSING FOR AN AUTOMOBILE ENTERTAINMENT SYSTEM", filed Jul. 21, 2004, which is incorporated herein by reference, U.S. patent application Ser. No. 10/895,099, entitled "INSTALLATION APPARATUS FOR AN AUTOMOBILE ENTERTAINMENT SYSTEM", filed Jul. 21, 2004, which is incorporated herein by reference, U.S. patent application Ser. No. 10/920,431, entitled "AUTOMOBILE ENTERTAINMENT SYSTEM", filed Aug. 18, 2004, which is incorporated herein by reference, and U.S. patent application Ser. No. 10/920,430, entitled "AUTOMOBILE ENTERTAINMENT SYSTEM", filed Aug. 18, 2004, which is incorporated herein by reference.

The present video system 112 is provided with the ability to offer a variety of functionalities. These functionalities may be hardwired or programmed within the video system 112 or the functionalities may be added in a modular manner via an expansion slot 140 provided within the video system 112. Contemplated functionalities include, but are not limited to satellite radio (for example, Serius, XM), Pictel phone, satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, Blu-ray technology, hot swap hard drive, satellite video import card, wireless video import card, supplemental hard drive, flash memory accessibility, wireless download capabilities, PCICM slots, etc.

In addition, the video system may also be provided with a flashlight 135 controlled by an on/off switch 135*a*, which runs off a battery 220 mounted within the video system 112. The video system 112 may further be provided with both a 110 A power outlet 137*a* and a 12 V power outlet 137*b* for connection with other electronic devices requiring power.

As the present video system 112 is designed for use at a variety of locations and potentially at locations remote from a cradle, the video system 112 is provided with a battery 220. The battery 220 is preferably a rechargeable battery and, as such, will be regularly recharged when the video system 112 is mounted within the cradle 138 and coupled to the power supply running therethrough.

Figure 45:
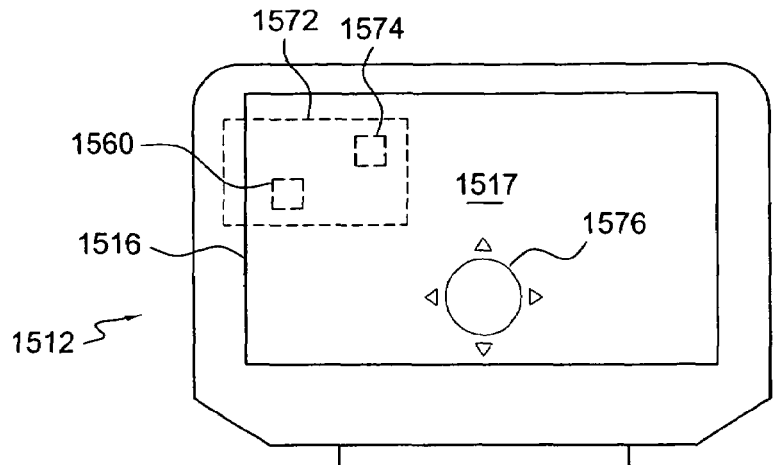
FIGS. 45 and 46 show a touch panel screen in which command instructions are oriented based upon the orientation of the video monitor.

As shown best with reference to the video system 412 as shown in FIG. 45, enhanced usage is further provided by the inclusion of USB ports, flash memory slots, cellular card slots, IR transmitters, RCA ports, power buttons or other a/v input/outputs, formed within the housing 418 of the video system 412 and contained behind cover 418*a*, 418*b* which may be selectively opened to reveal the ports and slots. The inclusion of these ports allows for ready attachment of the present video system to other remote a/v sources (for example, game consoles, portable digital music players, etc.). It is also contemplated such ports, slots and other accessories may be integrated with the cradle.

In addition, a broadcast television receiver and antenna may be integrated with the video monitor as discussed in U.S. patent application Ser. No. 11/177,405, which is incorporated herein by reference and/or the headrest.

Control of the video system 112, including the video monitor 116, DVD player 120, hard drive 123 and other components of the video system 112, is facilitated by the provision of control buttons along the outer surface of the video system 112. In accordance with a preferred embodiment of the present invention, the control buttons take the form of a multifunction controller 160 permitting movement of a cursor shown upon various interfaces displayed upon the video in a well known manner. In addition, conventional control buttons 162 may also be provided for control of traditional functions. In addition to the provision of manual control buttons 162, the video system 112 may further include a remote control (not shown) such that an individual need not actually touch the video system 112 to control the video system 112.

As briefly mentioned above, the present video system 112 (whether it be the video system disclosed with reference to FIGS. 1 to 4 or that disclosed with reference to the various other embodiments) is adapted for removal from the ceiling cradle 138 of an automobile 111 for use at a variety of other locations. In accordance with a preferred embodiment of the present invention, the other locations are provided with docking stations 1050, 1150, 1250 including auxiliary cradles 1038, 1138, 1238 shaped and dimensioned for receiving the video system 112 and coupling the video system 112 to power sources and a/v sources in a manner similar to the cradle 138 used in conjunction with the ceiling 113 (see FIGS. 30, 31 and 32).

Figure 30:
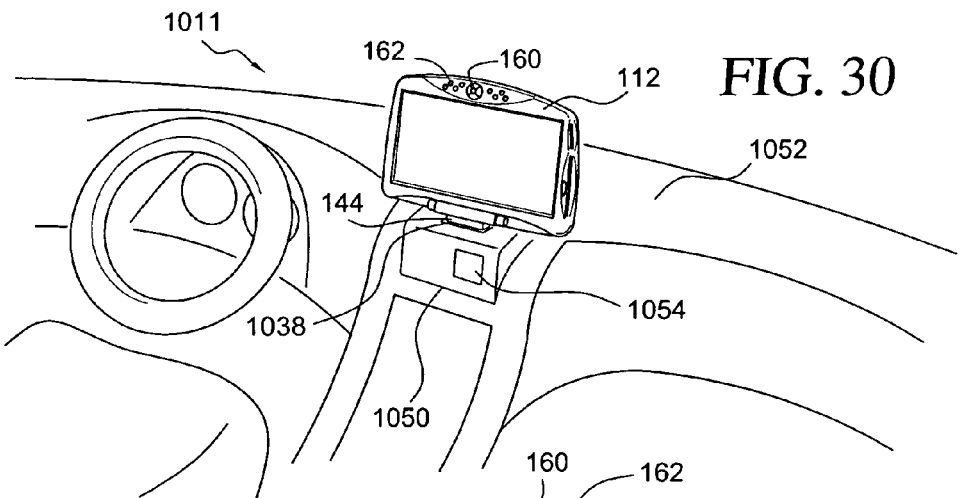
FIG. 30 shows the video system of FIG. 1 mounted within a dash docking station.

For example, and with reference to FIG. 30 a docking station 1050 for use in conjunction with the dash 1052 of a conventional automobile 1011 is shown. The docking station 1050 includes an auxiliary cradle 1038 (with electrical connections and a connecting mechanism (not shown)) shaped and dimensioned for receiving and securely holding the video system 112 and coupling the video system 112 to power sources and a/v sources in a manner similar to the cradle 138 used in conjunction with the ceiling 113. The docking station 1050 is mounted upon the dash 1052 of an automobile 1011 and is wired for connection to a power source and a/v sources. In addition, the dash docking station 1050 may include an integrated satellite receiver 1054 for providing satellite content to the passengers of the automobile 1011 by transmitting the satellite signal through the cradle 1038 and into the video system 112 via the respective electrical connections of the cradle 1038 and the video system 112. This embodiment is particularly useful where the video system 112 includes functionality relating to the provision of GPS guidance information. With this in mind, the driver will be able to selectively use the video system 112 for accessing guidance information when needed and return the video system 112 to the ceiling cradle 138 when guidance information is no longer needed.

Figure 31:
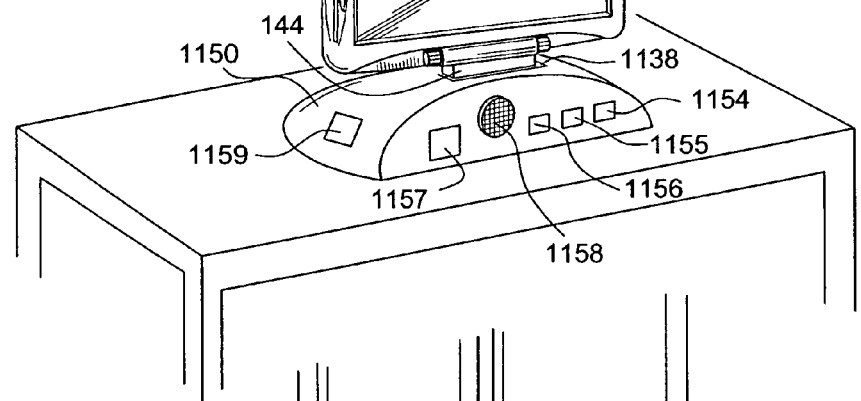
FIG. 31 shows the video system of FIG. 1 mounted within a mobile docking station.

With reference to FIG. 31, a mobile docking station 1150 may also be provided. The mobile docking station 1150 also includes an auxiliary cradle 1138 (with electrical connections and a connecting mechanism (not shown)) shaped and dimensioned for receiving and securely supporting the video system 112 and coupling the video system 112 to power sources and a/v sources in a manner similar to the cradle 138 used in conjunction with the ceiling. The docking station 1150 may include a battery pack 1155, a/v inputs 1156, a/v outputs 1157, Internet capability, speakers 1158, cable input 1159 and/or an integrated satellite receiver 1154. These components are linked to the video system 112 via the cradle 1138 which transmits the relevant signals to and from the video system 112 via the respective electrical connections of the cradle 1138 and the video system 112.

As shown in FIGS. 30 and 31, when the video system 112 is mounted to the docking stations 1050, 1150, it may be necessary to mount the video system 112 upside down when compared to its mounting within an automobile 111. With this in mind, the video system 112 is provided with the ability to rotate to the image shown on the video monitor 116 so that the video system 112 may be used in a variety of orientations. The possible rotation of the image shown on the video monitor 116 is complemented by the multifunctional controller 160 that adjusts to the rotation of the image such that the controller 160 is calibrated to function in accordance with the orientation of the screen image.

Figure 32:
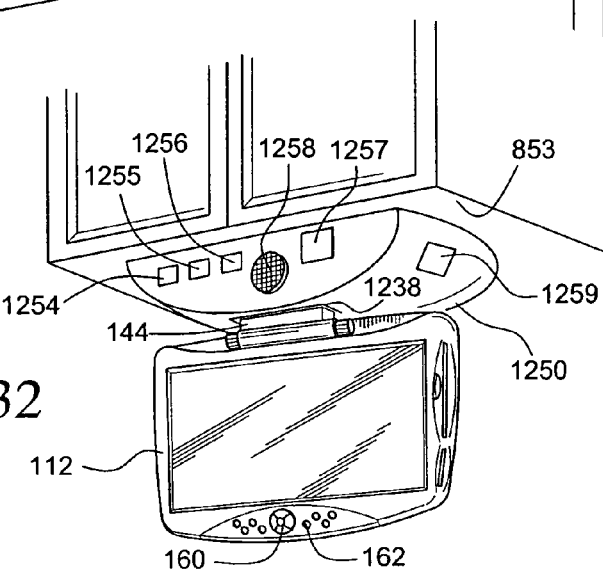
FIG. 32 shows the video system of FIG. 1 mounted within a static docking station.

With reference to FIG. 32, yet a further embodiment of a docking station 1250 is disclosed. This docking station 1250 is adapted for static mounting within a household, office or other locations (for example, beneath a kitchen cabinet 853). The docking station 1250 includes an auxiliary cradle 1238 (with electrical connections and a connecting mechanism (not shown)) shaped and dimensioned for receiving and securely supporting the video system 112 and coupling the video system 112 to power sources and a/v sources in a manner similar to the cradle 138 used in conjunction with the ceiling. The docking station 1250 may include a battery pack 1255, a/v inputs 1256, a/v outputs 1257, Internet capability, speakers 1258, cable input 1259 and/or an integrated satellite receiver 1254. These components are linked to the video system 112 via the cradle 1238 which transmits the relevant signals to and from the video system 112 via the respective electrical connections of the cradle 1238 and the video system 112.

As mentioned above, the present invention is adapted for utilization in conjunction with a dash mounted docking station. However, and as those skilled in the art will certainly appreciate, various state and local regulations prohibit the utilization of a front seat mounted video system wherein the driver of the vehicle is exposed to video entertainment. However, these state and local regulations do not prohibit a video display that provides the driver with useful information regarding the operation and performance of his or her vehicle, as well as navigation information provided with current GPS navigation systems.

With the foregoing in mind, the docking station 1350 disclosed with reference to FIGS. 33 to 41 is specifically adapted for utilization and mounting upon the dash 1352 of a conventional automobile 1311. Generally, and as will be discussed below in greater detail, the docking station 1350 is designed such that the video system 112 will provide only navigation-based displays when directed toward the driver of the automobile 1311 and will provide all video functionalities when oriented toward the passenger of the automobile 1311.

More particularly, and with reference to the various figures, the docking station 1350 includes a base 1360 upon which is mounted a cradle 1338. The base 1360 is shaped and dimensioned for secure attachment to the dash 1352 of an automobile 1311 using conventional brackets and coupling structures known to those skilled in the art. The cradle 1338 is pivotally mounted upon the base 1360 for movement about multiple axes. The cradle 1338 is shaped and dimensioned to receive and support the video system 112. With this in mind, the cradle 1338 is provided with quick release electrical connections 1342 for the audio input 1322, audio output 1324, video input 1326, video output 1328 and power supply 1330. As discussed previously, the video system 112 similarly includes mating electrical connections 144 for transmitting electricity and AV signals between the cradle 1338 and the video system 112. In particular, when the video system 112 is mounted upon the cradle 1338, the respective electrical connections 144, 1342 mate to provide for the transmission of power and AV signals between the video system 112 and the cradle 1338. As those skilled in the art will certainly appreciate, other readily removable electrical connections for other purposes may also be supplied if one determines they are so needed.

In addition to the electrical connections 1342 provided in the cradle 1338, the cradle 1338 also includes a connecting mechanism 1362 designed for selectively retaining the video system 112 within the cradle 1338. In accordance with a preferred embodiment of the present invention, a snap mechanism well known to those skilled in the industry will be used in selectively securing the video system within the cradle, although other coupling structure may be used without departing from the spirit of the present invention. The connecting mechanism 1362 permits ready and selective attachment of the video system 112 to the docking station 1350 while preventing vibrations and other damaging movements that may occur in an automobile. As those skilled in the art will certainly appreciate, the connecting mechanism may take a variety of forms known to those skilled in the art.

As discussed above, the cradle 1338 is mounted upon the base 1360 for pivotal movement relative thereto. With this in mind, a first pivotal coupling 1364 allows for forward and rearward tilting of the cradle 1338 to allow a viewer to adjust the viewing angle at which the video system 112 is oriented.

In addition, the base 1360 is provided with a second pivotal coupling 1366 allowing the cradle 1338 to be rotated about an axis extending substantially perpendicular to the base 1360 and providing for transverse rotation of the cradle 1338. This rotation allows the video system 112 to be selectively oriented for viewing by either the driver or the passenger in the front seat. Movement of the cradle 1338 about this axis is controlled by a release mechanism 1368 which allows one to selectively move the cradle 1338 about the second pivotal coupling 1366 and subsequently lock it in a desired position.

In accordance with a preferred embodiment of the present invention, it is contemplated a two stage release mechanism known to those skilled in the art will be used in an effort to enhance safety, although other release structures known within the art may be employed without departing from the spirit of the present invention.

The cradle 1338 (and ultimately the video system 112 via the electrical connections 144 and 1342) is electrically coupled to the second pivotal coupling 1366 via a switch 1370 so that it may signal the video system 112 as to the specific orientation of the cradle 1338; that is, whether the cradle 1338 is oriented for viewing by the driver or for by viewing of a passenger within the front seat. When the cradle 1338 is oriented for viewing by the driver (see FIG. 39) the switch 1370 signals the video system 112 that it is oriented for viewing by the driver and the video system 112 may, therefore, only display navigation based information. Control of these instructions is provided via the switch 1370 contained within the second pivotal coupling 1366, as well as the microprocessor 1374 controlling operation of the video system 112. When the video system 112 is rotated (see FIG. 40) for viewing by the passenger, the switch 1370 is once again activated and the video system 112 is instructed that the cradle 1338 is oriented for viewing by the passenger within the front seat of the automobile 1311. When this instruction is provided, the video system 112 is then able to perform all functionalities associated therewith.

As those skilled in the art will appreciate, the functionalities may include, but are not limited to the various functions previously discussed with relation to the prior embodiments. In addition, and as with the prior embodiments, the docking station 1350 may further include a battery pack, AV inputs, AV outputs, Internet capabilities, speakers, cable input, and/or integrated satellite receivers. Those skilled in the art will also appreciate that the concepts underlying the present docking station may be employed with a system wherein the video system is integrated with the docking station, and is, therefore, designed only for use as a dash-mounted video system.

Figure 42:
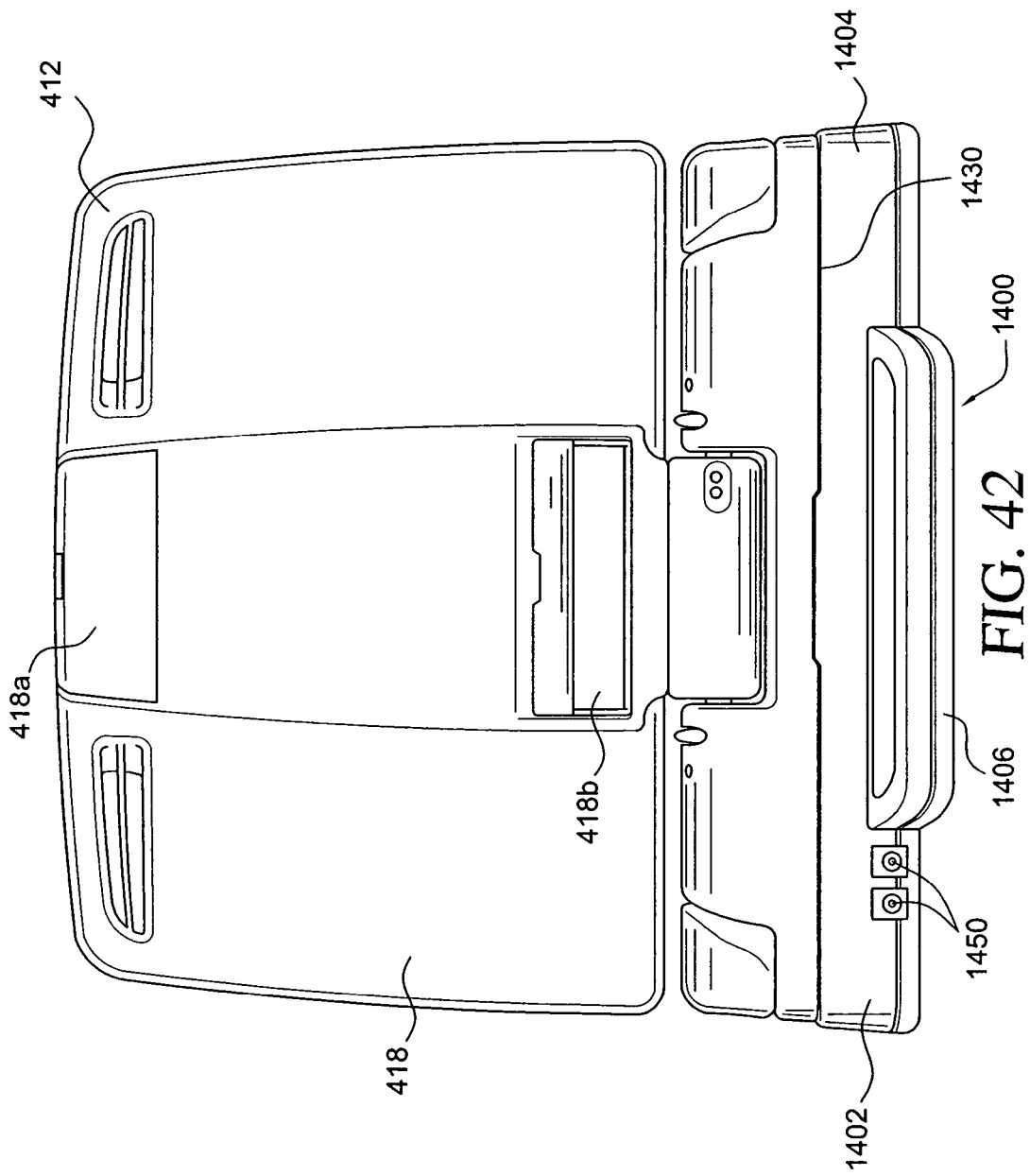
FIGS. 42, 43 and 44 respectively show a rear view, side view and exploded perspective view of a portable docking station for use in accordance with the present invention.
Figure 43:
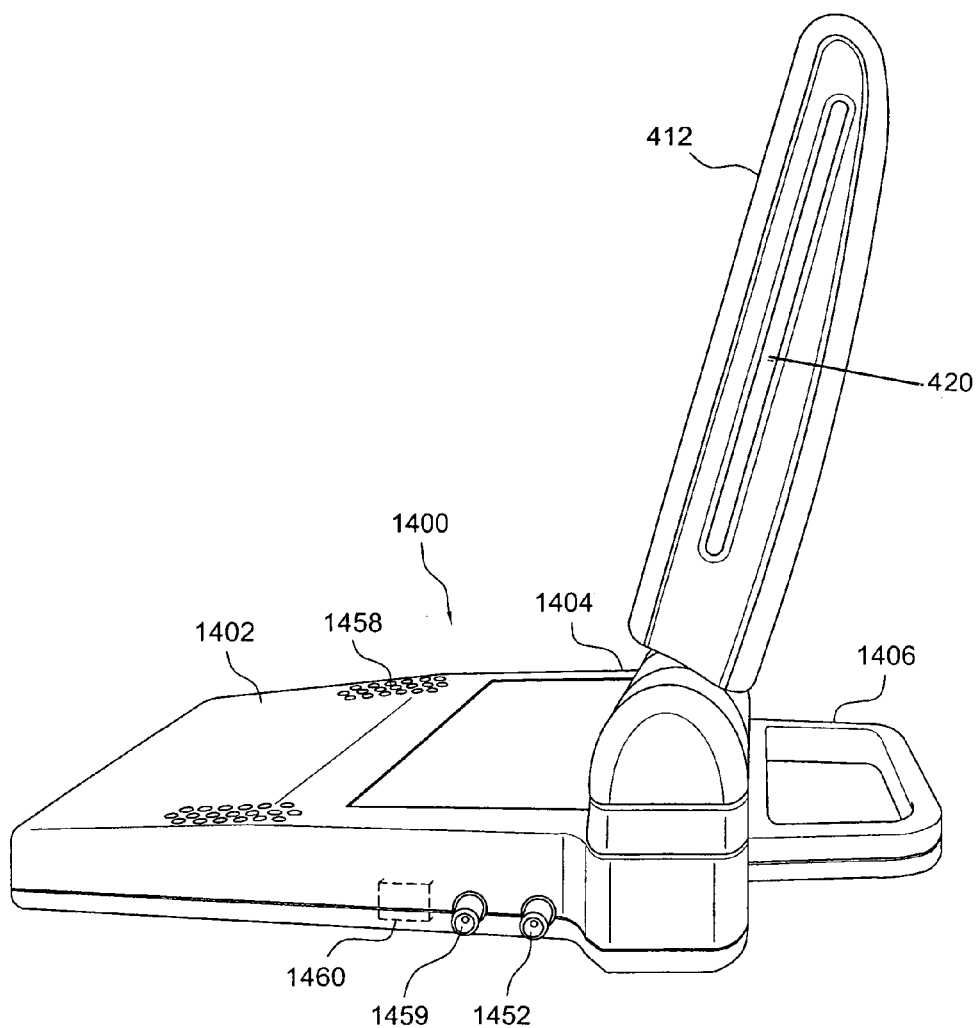
Figure 44:
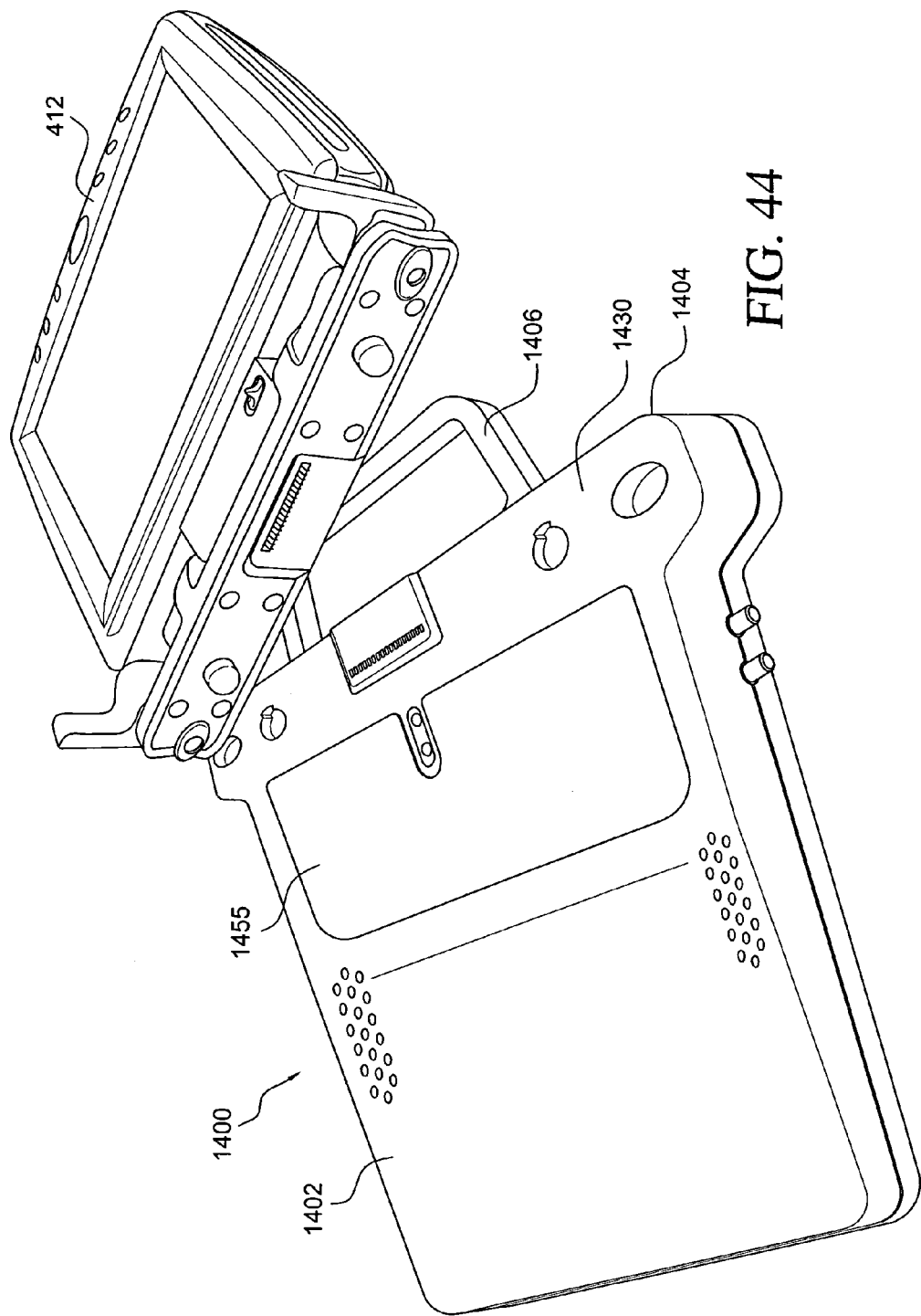

In addition to the fixedly mounted docking stations disclosed above, a portable docking station 1400 is disclosed with reference to FIGS. 42, 43 and 44. As with the fixedly mounted docking stations, this portable docking station 1400 includes a cradle 1430 shaped and dimensioned for receiving the video system 412 (although the present disclosure applies equally to the other video system embodiments disclosed herein) and coupling the video system 412 to power sources and a/v sources in a manner similar to the cradle used in conjunction with the ceiling.

The docking station 1400 includes a housing 1402 in which a cradle 1430 is positioned at a first end 1404 thereof. The cradle 1430 includes fastening structures similar to those disclosed above with reference to FIGS. 9, 10 and 11 to permit selective attachment of the video system 412 thereto. The housing 1402 further includes a handle 1406 adjacent the cradle 1430 for carrying the video system 412 in a convenient and comfortable manner.

As with the fixedly mounted docking stations, this portable docking station 1400 includes inputs 1450, 1452 for connection to a power source and a/v sources. In addition, the docking station 1400 includes a battery 1455 for additional power storage for use when now hardwired power source is readily available. The docking station 1400 also includes Internet capability, speakers 1458, cable input 1459 and/or an integrated satellite receiver 1460. These components are linked to the video system 412 via the cradle 1430 which transmits the relevant signals to and from the video system via the respective electrical connections of the cradle and the video system.

Figure 46:
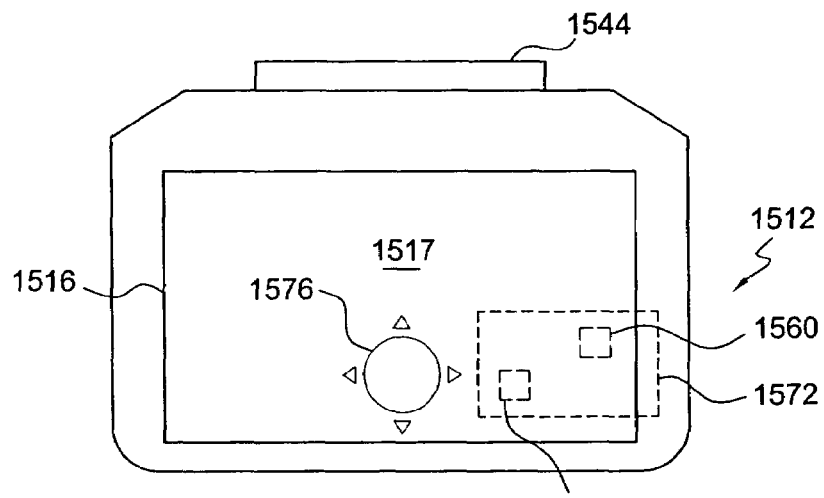

A further feature of the present invention is disclosed with reference to FIGS. 45 and 46. In accordance with this embodiment, the potential that the video system may be utilized in a variety of orientations (for example flipped upside down) is addressed by providing a video system 1512 with a video monitor 1516 having a touch screen VGA panel 1517. The video system 1512 also includes a touch panel control system 1560 that "flips" the graphical user interface control panel 1576 when the video system 1512 is positioned in a specific orientation. In particular, the microprocessor 1572 of the video system 1512 is provided with an orientation sensor 1574. The orientation sensor 1574 instructs the microprocessor 1572 as to the orientation of the video system 1512. Based upon the orientation of the video system 1512, a graphical user interface control panel 1576 provided upon the touch screen panel 1517 of the video system 1512 orients itself for viewing and actuation by a user. For example, and with reference to FIG. 45, when the video system 1512 is oriented with the electrical connections 1544 facing downwardly, for example, when used in a dash docking station, the control panel 1576 is provided in a horizontal orientation properly positioned for viewing by the automobile passenger. However, when the video system 1512 is transferred and oriented from an overhead support, for example, when mounted in the ceiling of a vehicle or under a cabinet, the orientation sensor 1574 senses that the video system 1512 is oriented in this configuration and instructs the microprocessor 1572 to provide the touch screen panel 1517 with a control panel 1576 the opposite of those shown with reference to FIG. 45 (see FIG. 46). This feature obviates the need for users of the present system to read upside down instructions when the video system 1512 is provided with a touch screen mechanism.

Figure 47:
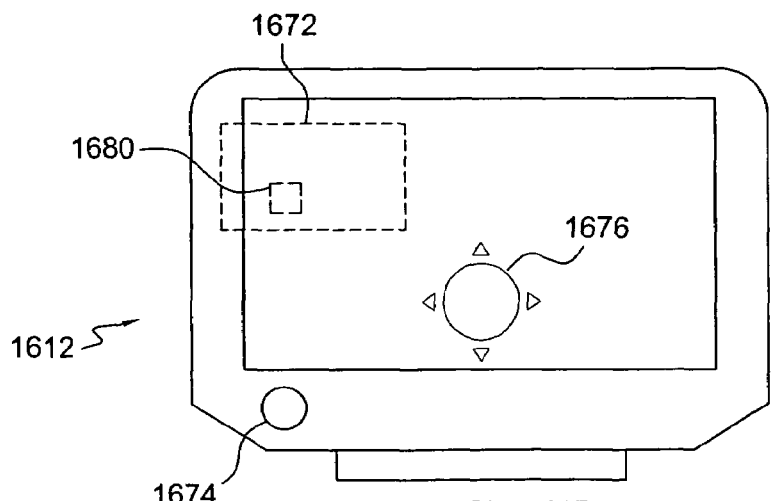
FIG. 47 shows an alternate embodiment of the feature presented with reference to FIGS. 45 and 46.

Referring to FIG. 47, the orientation adjustment feature of the video system 1612 may also be implemented manually through the inclusion of a switching button 1674 which will instruct the microprocessor 1672 and touch panel control system 1660 to orient the control panel 1676 in a desired orientation.

In view of the wide range of functionalities offered in accordance with the present invention, the video monitor may be supplemented with the use of Sharp's dual screen monitor technology. In this way, one may view one video content when looking at the monitor from one angle and view another video content when viewing the video monitor from another angle. Sharp's dual screen technology provides for the simultaneously display of different information and image content in right and left views in a single unit by directionally controlling the viewing angle of the LCD. This feature makes it possible to provide information and content tailored to specific users depending on the angle at which they view the screen. Using a number of technologies, such as a parallax barrier superimposed on an ordinary TFT LCD, the LCD sends the light from the backlight into right and left directions, making it possible to show different information and visual content on the same screen at the same time depending on the viewing angle. Controlling the viewing angle in this way allows the information or visual content to be tailored to multiple users viewing the same screen. For example, one user can view the display as a PC screen for browsing the Internet or for editing video shot using a digital camera (IT) while at the same time another user watches video content such as a movie or a TV broadcast (A/V).

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A vehicle, comprising:
   a ceiling;
   a cradle secured within the ceiling of the vehicle; and
   a video system selectively secured to the cradle for movement between a use position and a storage position, the video system includes a base shaped and dimensioned for selectively coupling with the cradle, the base includes a first hinge facilitating rotation of the video system, wherein the first hinge includes a safety lock preventing movement of the video system from the storage position to the use position.

2. The vehicle according to claim 1, wherein the base further includes a second hinge permitting rotation of the video system about an axis substantially perpendicular to the axis of the first hinge.

3. The vehicle according to claim 1, wherein edges of the video system are exposed with no surrounding structure when in its storage position.

4. The vehicle according to claim 1, wherein the video system includes a video source and a video monitor.

5. The vehicle according to claim 1, wherein the video system includes a housing in which a video monitor and video source are housed, the housing depending from the base shaped and dimensioned for selectively attachment to the cradle.

6. The vehicle according to claim 5, wherein the base includes a means for pivoting the video monitor.

7. The vehicle according to claim 1, further including a cover for covering the cradle when it is not in use, the cover being substantially flush with the headliner and conforming with a profile thereof.

8. The vehicle according to claim 7, wherein the cover includes a light.

9. The vehicle according to claim 7, wherein the cover includes a power source.

10. The vehicle according to claim 1, wherein the cradle is substantially flush with a headliner of the vehicle.

11. An entertainment system for a vehicle, comprising:
    a cradle shaped and dimensioned for securing within a ceiling of the vehicle; and
    a video system selectively secured to the cradle for movement between a use position and a storage position, the video system includes a base shaped and dimensioned for selectively coupling with the cradle, the base includes a first hinge facilitating rotation of the video system, wherein the first hinge includes a safety lock preventing movement of the video system from the storage position to the use position.

12. The entertainment system according to claim 11, wherein the base further includes a second hinge permitting rotation of the video system about an axis substantially perpendicular to the axis of the first hinge.

13. The entertainment system according to claim 11, wherein edges of the video system are exposed with no surrounding structure when in its storage position.

14. The entertainment system according to claim 11, wherein the video system includes a video source and a video monitor.

15. The entertainment system according to claim 11, wherein the video system includes a housing in which a video monitor and video source are housed, the housing depending from the base shaped and dimensioned for selectively attachment to the cradle.

16. The entertainment system according to claim 15, wherein the base includes a means for pivoting the video monitor.

17. The entertainment system according to claim 11, further including a cover for covering the cradle when it is not in use, the cover being substantially flush with a headliner of the vehicle and conforming with a profile thereof.

18. The entertainment system according to claim 17, wherein the cover includes a light.

19. The entertainment system according to claim 17, wherein the cover includes a power source.

20. The entertainment system according to claim 11, wherein the cradle is substantially flush with a headliner of the vehicle.

* * * * *